US012185731B2

(12) United States Patent
Martin et al.

(10) Patent No.: US 12,185,731 B2
(45) Date of Patent: Jan. 7, 2025

(54) SYSTEM AND METHOD FOR SEPARATING BREAST FROM POULTRY CARCASS

(71) Applicant: John Bean Technologies Corporation, Chicago, IL (US)

(72) Inventors: Steven E. Martin, Canal Winchester, OH (US); Cezary J. Mroz, Elkhorn, WI (US)

(73) Assignee: John Bean Technologies Corporation, Chicago, IL (US)

( * ) Notice: Subject to any disclaimer, the term of this patent is extended or adjusted under 35 U.S.C. 154(b) by 65 days.

(21) Appl. No.: 18/069,849

(22) Filed: Dec. 21, 2022

(65) Prior Publication Data

US 2024/0206483 A1    Jun. 27, 2024

(51) Int. Cl.
A22C 21/00    (2006.01)

(52) U.S. Cl.
CPC ...... *A22C 21/0023* (2013.01); *A22C 21/0053* (2013.01)

(58) Field of Classification Search
CPC .................................................. A22C 21/0053
USPC ....................................................... 452/157
See application file for complete search history.

(56) References Cited

U.S. PATENT DOCUMENTS

| | | | |
|---|---|---|---|
| 4,586,215 A | | 5/1986 | Meyn |
| 4,935,990 A | * | 6/1990 | Linnenbank ....... A22C 21/0023 452/167 |
| 5,312,291 A | * | 5/1994 | van den Nieuwelaar ............... A22C 21/003 452/169 |
| 5,569,069 A | * | 10/1996 | Horst ................. A22C 21/0023 452/169 |
| 5,618,230 A | * | 4/1997 | Bargele .............. A22C 21/0023 452/169 |
| 5,954,574 A | * | 9/1999 | Verrijp ............... A22C 21/0023 452/169 |
| 6,277,020 B1 | * | 8/2001 | Stephens ............ A22C 21/0023 452/169 |
| 2011/0059684 A1 | * | 3/2011 | Van Den Nieuwelaar .................. A22C 21/0092 452/127 |
| 2012/0208443 A1 | * | 8/2012 | Hazenbroek ....... A22C 21/0023 452/169 |
| 2013/0165032 A1 | * | 6/2013 | De Vos ............. A22C 21/0023 452/149 |

FOREIGN PATENT DOCUMENTS

EP    1 956 919 A2    8/2008

OTHER PUBLICATIONS

Extended European Search Report mailed May 31, 2024, issued in corresponding European Patent Application No. 23217170.2, filed Dec. 15, 2023, 11 pages.

* cited by examiner

*Primary Examiner* — Richard T Price, Jr.
(74) *Attorney, Agent, or Firm* — Christensen O'Connor Johnson Kindness PLLC

(57) ABSTRACT

A carcass separation assembly may include a first blade assembly configured to separate a first breast muscle from at least one of wish bone, a rib bone, and a fan bone on a first side of a poultry carcass as the poultry carcass moves downstream passed the first blade assembly. The carcass separation assembly may further include a first tensioning assembly configured to support a first wing of the poultry carcass in a spaced apart relationship relative to the first breast muscle as the poultry carcass moves downstream passed the first blade assembly.

20 Claims, 26 Drawing Sheets

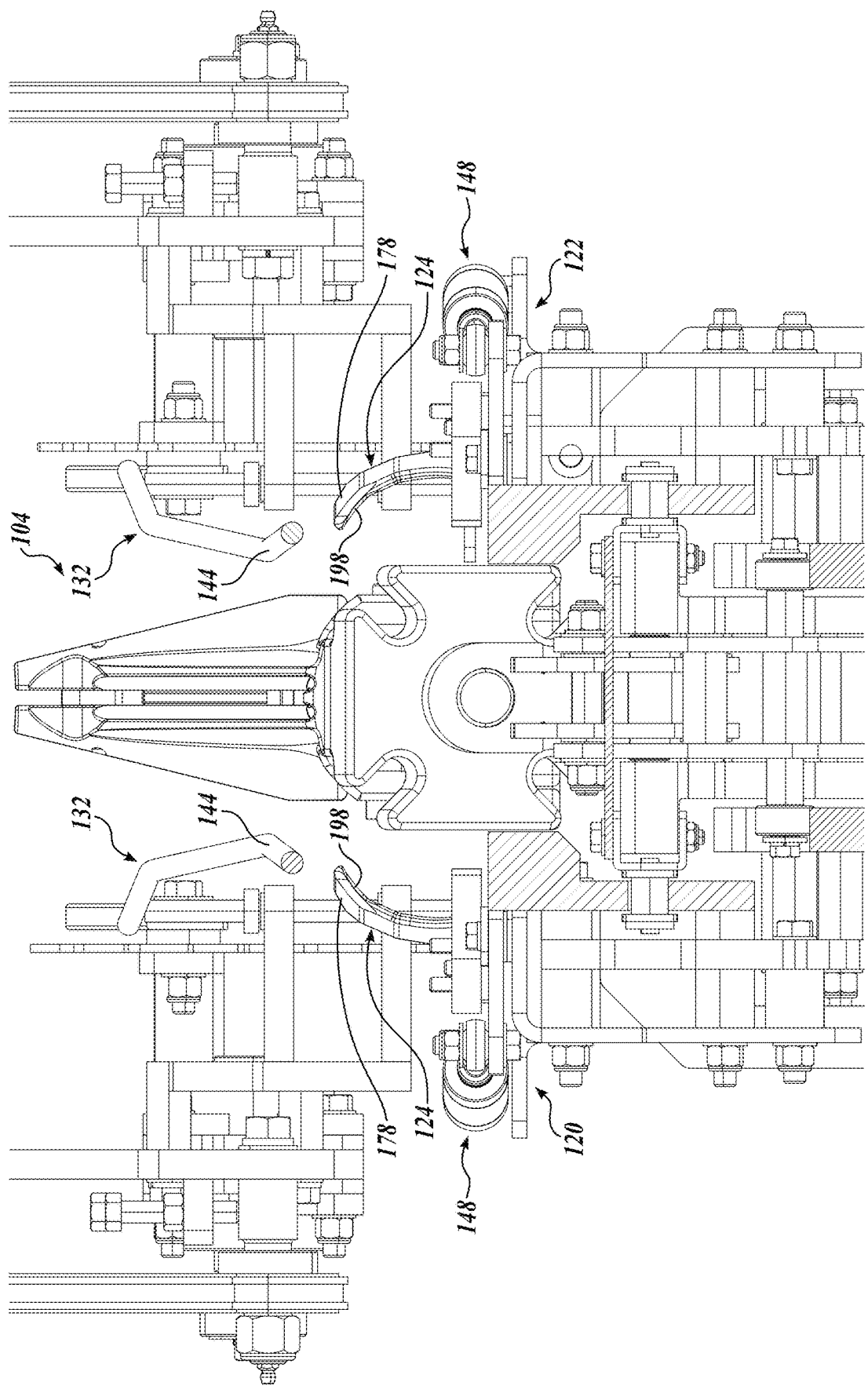

SYSTEM AND METHOD FOR SEPARATING BREAST FROM POULTRY CARCASS

BACKGROUND

Animal carcasses are often portioned or otherwise cut into smaller pieces by processors in accordance with customer needs. When dealing with poultry, ensuring the complete and safe removal of bones from the end products is a challenge. Between the wish bone, the rib bones, and the fan bone, there are many small and fragile skeletal structures in the poultry carcass that can shatter and get stuck in the meat. These bones reduce the overall quality of the meat and create a health hazard for consumers. Ensuring the complete removal of chicken bones from poultry products is of paramount importance to any poultry food company.

SUMMARY

In some aspects, the systems and techniques described herein relate to a carcass separation assembly, including: a first blade assembly configured to separate a first breast muscle from at least one of wish bone, a rib bone, and a fan bone on a first side of a poultry carcass as the poultry carcass moves downstream passed the first blade assembly; and a first tensioning assembly configured to support a first wing of the poultry carcass in a spaced apart relationship relative to the first breast muscle as the poultry carcass moves downstream passed the first blade assembly.

In some aspects, the systems and techniques described herein relate to a carcass separation blade configured to separate a first breast muscle from at least one of wish bone, a rib bone, and a fan bone on a first side of a poultry carcass as the poultry carcass moves past the carcass separation blade, including: a body having a first end opposite a second end, wherein at least a portion of the body between the first and second ends is shaped to substantially correspond to a shape of a portion of the first side of the poultry carcass; a curved upstream edge extending between at least a portion of the first and second ends of the body; and a shearing edge portion defined along at least a portion of the curved upstream edge.

In some aspects, the systems and techniques described herein relate to a method of separating a first breast muscle from a poultry carcass, including: moving a poultry carcass downstream along a processing line toward a first blade assembly; engaging a first blade of the first blade assembly with a first side of the poultry carcass near an attachment of the first breast muscle to bones of the first side of the poultry carcass as the poultry carcass moves downstream passed the first blade assembly; and supporting a first wing of the poultry carcass in a spaced apart relationship relative to the first breast muscle as the poultry carcass moves downstream passed the first blade assembly.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 9A shows a partial cross-sectional front view (viewing downstream) of the carcass separation assembly of FIG. 1, wherein blades of the carcass separation assembly are shown in a disengaged position.

DETAILED DESCRIPTION

Systems and methods disclosed herein are directed to a carcass separation assembly and method for separating consumable muscle and other products from poultry and other animals. In some embodiments, the carcass separation assembly and method disclosed herein is configured to separate a breast muscle from a poultry carcass with the small and fragile skeletal structures (such as the wish bone, the rib bones, and the fan bone) remaining attached to the carcass. In this manner, the breast muscle may be subsequently removed substantially bone-free from the poultry carcass. The carcass separation assembly may be incorporated into a poultry processing machine configured for removing consumable muscle from the carcass of poultry or it may instead be used as a separate or stand-alone assembly.

Figure 1:
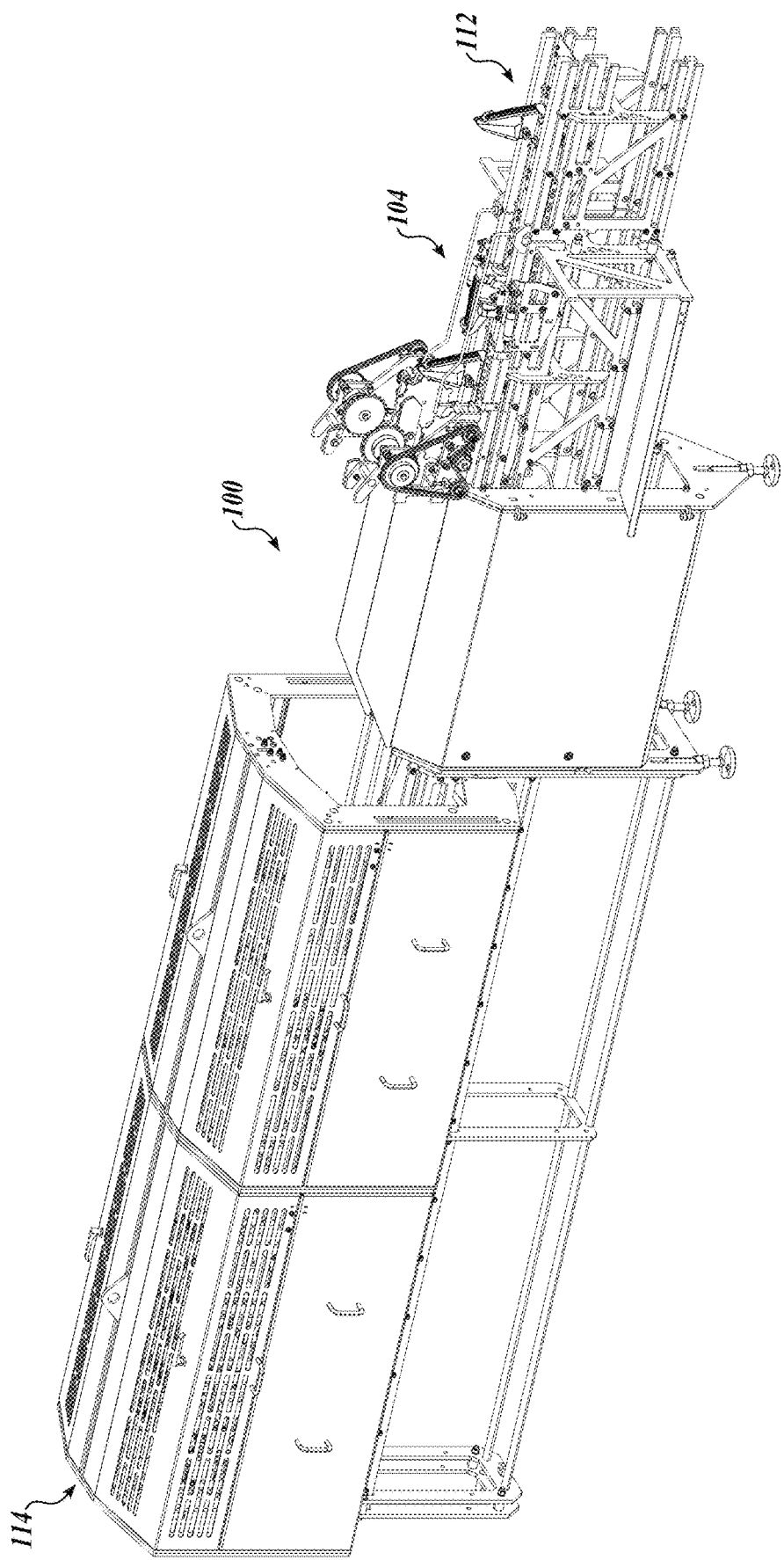
FIG. 1 shows a perspective view of a poultry processing machine incorporating a carcass separation assembly according to exemplary embodiments of the present disclosure.

FIG. 1 shows an exemplary poultry processing machine 100 that incorporates a carcass separation assembly 104 formed in accordance with exemplary embodiments of the present disclosure. The poultry processing machine 100 may be used in a poultry processing plant, and it may be placed near other machines that act upon poultry carcasses or components of poultry carcasses, such as by cutting, skinning, moving or otherwise processing the carcasses or components thereof. For example, the poultry processing machine 100 may be placed in series with other machines that the poultry carcasses or components are moved along to progressively perform actions on the carcasses or components to subdivide the carcass into marketable poultry components, including, without limitation, wings, breasts, legs, and thighs. For instance, the poultry processing machine 100 shown in FIG. 1 may incorporate certain aspects shown and described in U.S. patent Ser. No. 10/595,539, entitled "Apparatus and method for deboning poultry breasts," the entire disclosure of which is incorporated herein. It should be appreciated that the carcass separation assembly 104 may be adapted for use with any suitable carcass processing machine.

The poultry processing machine 100 has a rigid frame (not labeled or described in detail) that may be made of stainless steel or any other suitably rigid and food-safe material, and to which numerous components attach, for providing a foundation for the poultry processing machine 100. The frame may have feet, legs, wheels and any other structures that rest on the floor surface of a factory to permit stable use of the poultry processing machine 100, possibly along with movement of the apparatus poultry processing machine 100 along the surface upon which it rests until reaching a desired location.

The poultry processing machine 100 may include a conventional cone line (not shown in FIG. 1) for transporting poultry carcasses along the machine's components between an entry end 112 and an exit end 114. Before reaching the entry end 112, a poultry carcass, which may be chicken, turkey, Cornish hen, grouse, quail, or any other bird, is disposed on an upwardly oriented fixture, such as a cone which fits inside the rib cage, with the breasts facing upstream and the back facing downstream. Downstream is the direction the cones move toward (the leftward direction in the orientation of FIG. 1).

Figure 2:
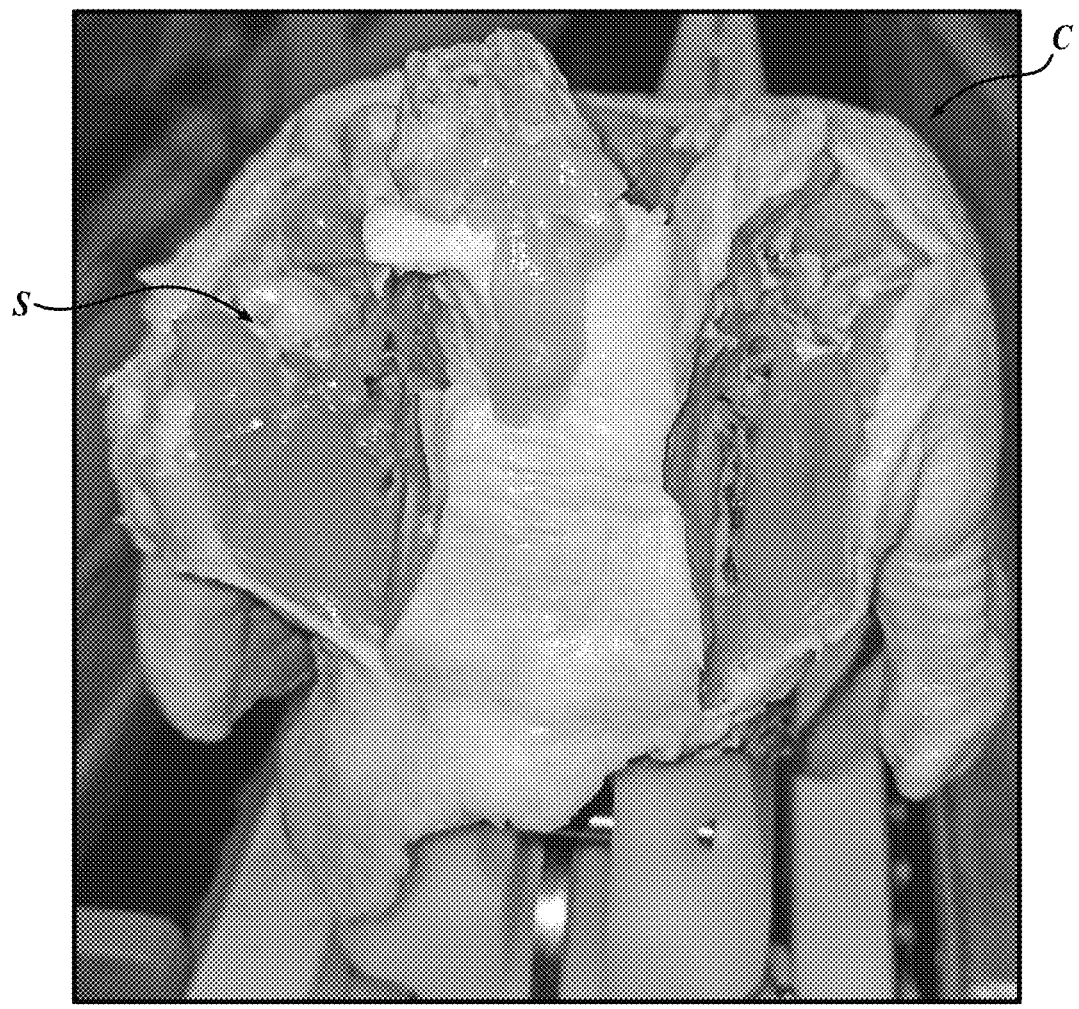
FIG. 2 shows a photograph of a chicken carcass having shoulder cuts according to exemplary embodiments of the present disclosure.

After disposing the poultry carcass on a cone, one or more people may make cuts to the carcass using hand-held knives to sever the shoulder joint ligaments connecting the wings to the carcass, as shown in the image of FIG. 2. Alternatively, a shoulder-cutting device may be used, such as the device shown and described in U.S. Pat. No. 5,466,185, entitled "Removing breast meat from poultry", the entire disclosure of which is hereby incorporated by reference herein. The shoulder cuts sever the ligaments connecting the drumette of the wings to the carcass. In that regard, the cuts sever the shoulder joint ligaments while allowing the wings to remain tied to the breast muscle by flesh and certain tendons when the breast muscle is removed from the carcass.

Figure 4:
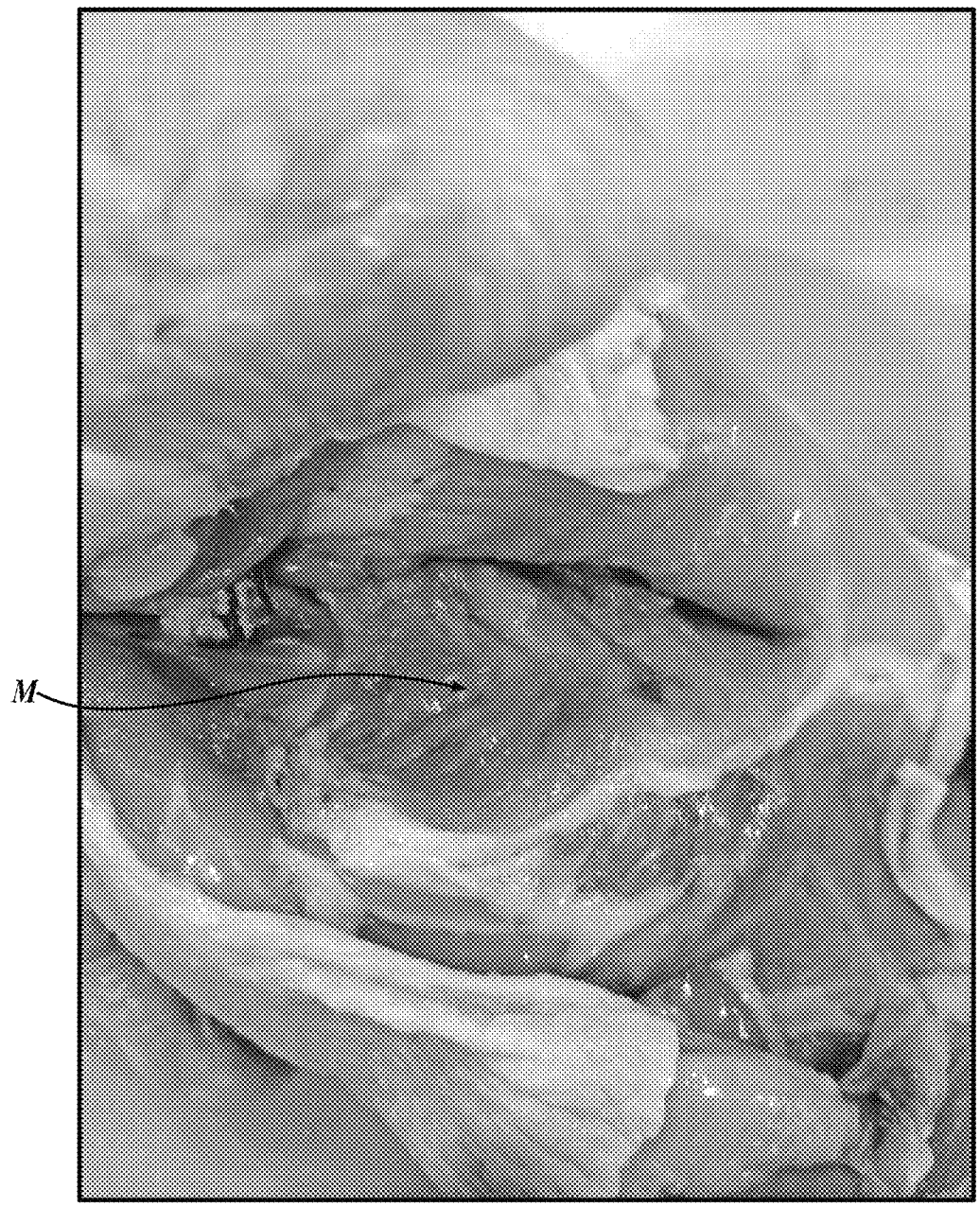
FIG. 4 shows a photograph of a chicken carcass having a breast separated by cutting.

After shoulder cutting, the poultry carcass is moved downstream to a breast removal station or area, where the poultry breast muscle, mainly the muscle pectoralis major, is removed from the carcass. Producers prefer to maximize yields by harvesting other minor muscles in the vicinity of the breast, such as the "eye" muscle serratus anterior. To maximize harvest yield, the poultry breast muscle is typically pulled or peeled off the carcass rather than being cut or sliced off the carcass (see FIG. 4 showing minor muscles M left attached to the rib cage when the breast is removed by cutting/slicing). For instance, the breast muscle may be pulled off the carcass in a manner similar to that shown and described in U.S. Pat. No. 5,466,185. Using such a method, the breast muscle is pulled by the wings away from the rib cage, drawing the breast meat with them.

As noted above, ensuring the complete and safe removal of bones from a poultry breast is a challenge. Between the wish bone, the rib bones, and the fan bone, there are many small and fragile skeletal structures in the poultry carcass that can shatter and get stuck in the meat. These bones reduce the overall quality of the meat and create a health hazard for consumers.

An overview of the poultry carcass skeletal, muscle and connective tissues affecting breast removal will be described with reference to FIGS. 3, which depicts a half of a poultry carcass skeleton. A keel, which is a cartilaginous extension of the sternum (breastbone), extends axially along substantially the center of the carcass, generally dividing the poultry breast (which is butterfly shaped when removed and flattened) in half. In that regard, the poultry breast muscle attaches to the sternum/keel at the junction of the breasts.

Figure 3:
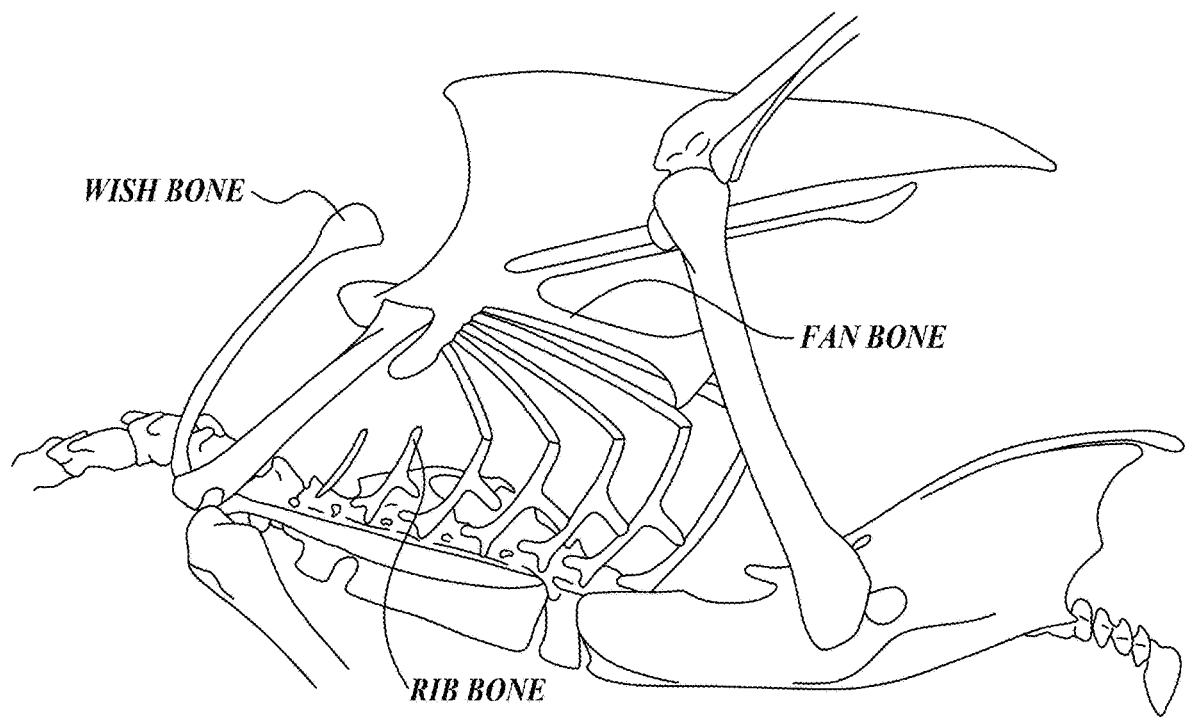
FIG. 3 shows a perspective view of a half of a chicken skeleton, showing small and fragile skeletal structures such as the wish bone, the rib bones, and the fan bone.

First and second sets of ribs extend generally rearwardly, outwardly, and downwardly from a bottom forward portion of the sternum/keel on each side of the sternum/keel (only one set of ribs shown in FIG. 3). A first fan bone extends generally axially and outwardly from the bottom forward portion of the sternum/keel above a first set of ribs. A second fan bone extends generally axially and outwardly from the bottom forward portion of the sternum/keel above a second set of ribs (not shown in FIG. 3). The fan bone has a thin, elongated, generally flattened shape with a flared or enlarged portion located at its end distally from the sternum. The thin end of the fan bone is integrally formed with the bottom forward portion of the sternum/keel.

The poultry breast muscle attaches to the sternum/keel, the ribs, and the fan bone through connective tissue. The adhesion strength of the connective tissue between the breast muscle and the fan bone, which may be defined at least in part by the surface tension of the connective tissue cells, is stronger in comparison to the force needed to shear or break the fan bone from the sternum/keel. In other words, when removing the breast muscle from the poultry carcass, the fan bone often breaks off from the sternum/keel due to the connective tissue adhesions between the breast muscle and the fan bone. As such, the fan bone can undesirably stay attached to the removed breast muscle.

Scraper blades may be used during separation of the poultry breast from the carcass to help separate the breast from carcass bones, such as the wish bone. However, after extensive experimentation and testing, the inventors have found that scraper blades do not successfully and reliable separate the breast muscle from the fan bone during the breast removal process. The carcass separation assembly 104 shown and described herein is configured to reliably and effectively separate the breast muscle from the fan bone, among other bones.

Referring to FIGS. 5-16, the carcass separation assembly 104 will now be described in detail. In general, the carcass separation assembly 104 is configured to prepare the breast muscle for separation from a poultry carcass such that the breast muscle may be removed from the carcass without the fan bone or any other bones (e.g., wish bone, rib bones) attached to the breast muscle. In that regard, the carcass separation assembly 104 may be located between the shoulder cutting station and the breast removal station.

The carcass separation assembly 104 generally includes a first blade assembly 120 configured to engage a first side of the poultry carcass as it passes the carcass separation assembly 104 and a second blade assembly 122 configured to engage a second side of the poultry carcass as it passes the carcass separation assembly 104. The first and second blade assemblies 120 and 122 each include a blade 124 that, when substantially engaged against the poultry carcass in a predefined configuration, substantially separates the breast muscle from the fan bone on the corresponding side of the carcass. The carcass separation assembly 104 further includes a wing tensioning assembly 128 configured to optimally position and support the wings of the carcass relative to the body of the carcass during separation. For instance, the tensioning assembly 128 pulls the wings outwardly and upwardly from the carcass body to help facilitate separation of the breast from the fan bone.

As noted above, the carcass separation assembly 104 may be incorporated into a poultry processing machine 100 that uses a conventional cone line for transporting poultry carcasses along the processing line. At an entry end 112, the poultry carcass is placed onto an upright cone and shoulder cuts are made. After the shoulder cuts are made, the cone supporting the poultry carcass may pivot counterclockwise to position the carcass in a substantially horizontal orientation as the poultry carcass moves downstream toward the first and second blade assemblies 120 and 122. In the substantially horizontal orientation, the poultry carcass is oriented with the breast muscles facing away from a horizontal conveyance plane of the processing line (see FIGS. 12-14). Any suitable conventional cone line mechanisms or other mechanisms suitable for use with the cone line may be used to pivot the cone supporting the poultry carcass counterclockwise into the substantially horizontal orientation.

With the poultry carcass in a substantially horizontal orientation, the cone supporting the poultry carcass is moved downstream and the carcass engages the tensioning assembly 128. As noted above, the tensioning assembly 128 is configured to optimally position and support the wings of the carcass relative to the body of the poultry carcass during separation. In general, the tensioning assembly 128 pulls the wings outwardly and upwardly from the carcass body to support the wings of the carcass in a spaced apart relationship relative to the breast muscles as the carcass moves downstream passed the first and second blade assemblies 120 and 122. Although the tensioning assembly 128 is described as supporting the wings of the carcass relative to the body, it should be appreciated that the tensioning assembly 128 may also support any part of the carcass that is considered the "shoulder" that is attached to the wing as a result of the shoulder cut (e.g., the shoulder portion of the carcass lateral of the shoulder cut). Accordingly, when describing the tensioning assembly 128 as supporting the wings of the carcass, it should also be understood that the tensioning assembly 128 can be understood to support any relevant shoulder portion of the carcass that is attached to the wing.

Figure 5A:
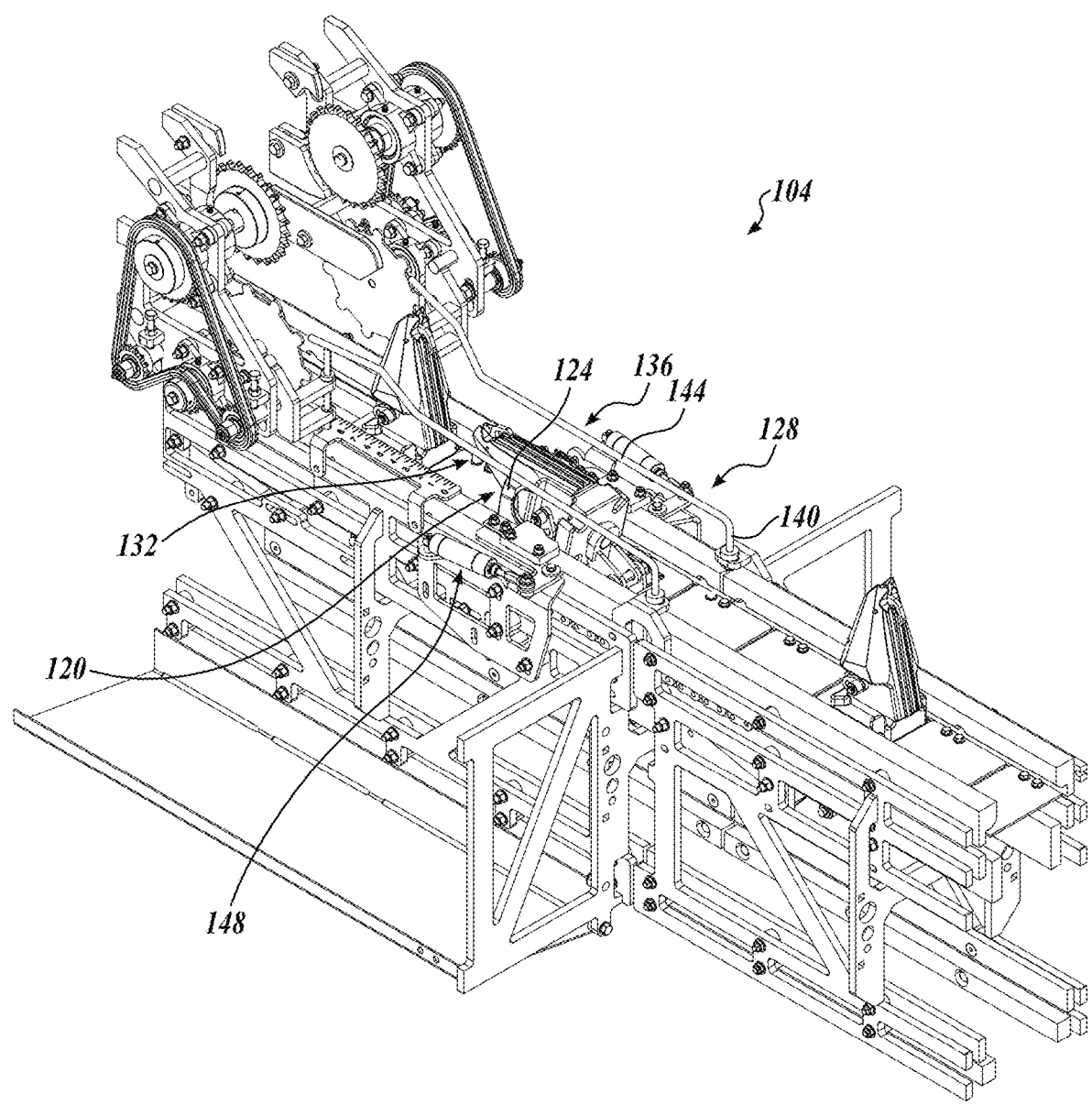
FIG. 5A shows a first perspective view of the carcass separation assembly of FIG. 1.
Figure 5B:
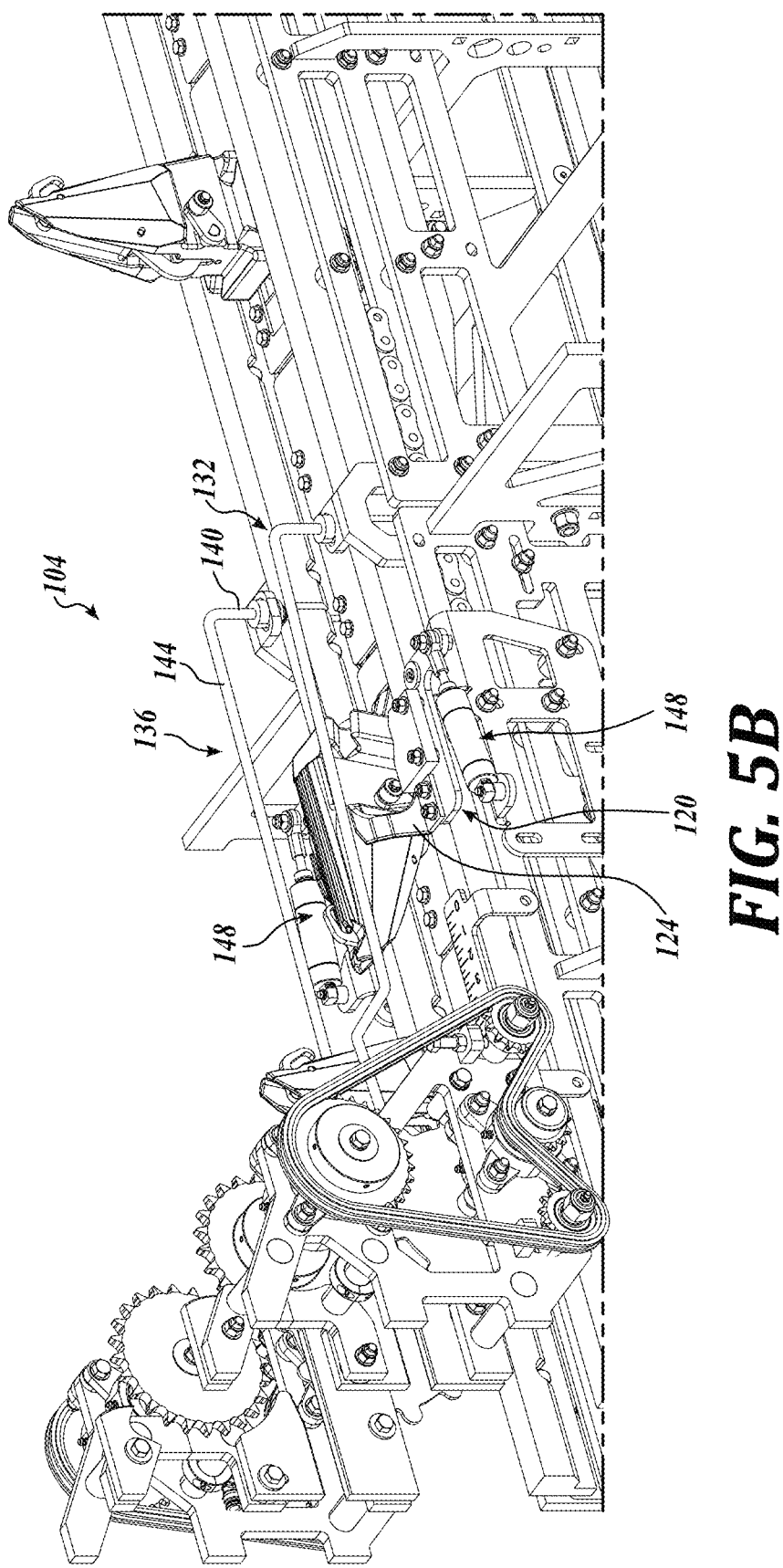
FIG. 5B shows a second, zoomed-in perspective view of the carcass separation assembly of FIG. 1.
Figure 6:
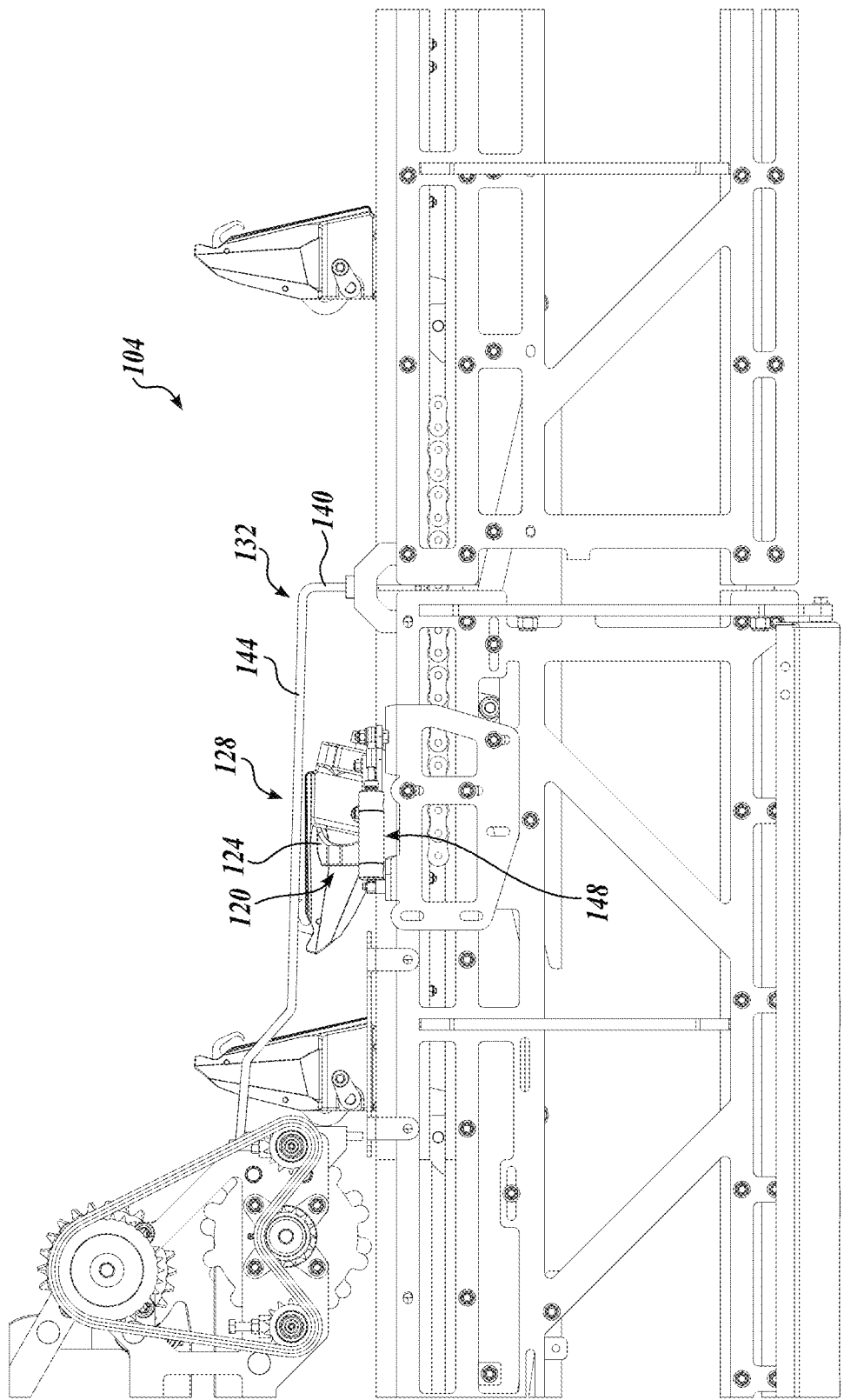
FIG. 6 shows a side view of the carcass separation assembly of FIG. 1.
Figure 7A:
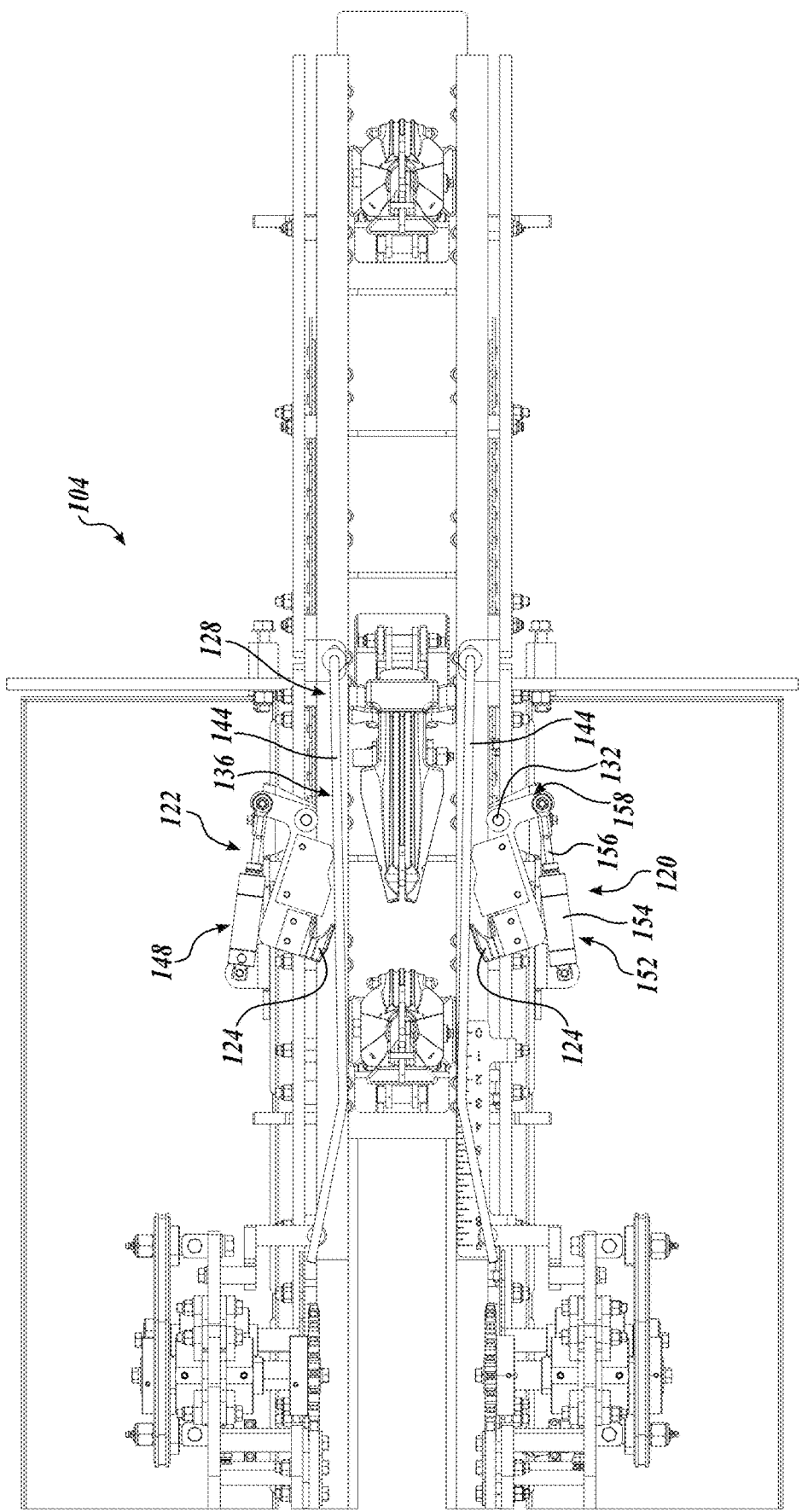
FIG. 7A shows a top view of the carcass separation assembly of FIG. 1, wherein blades of the carcass separation assembly are shown in a disengaged position.

Referring to FIGS. 5B, 6, and 7A, the tensioning assembly 128 is configured as a first guide bar 132 extending along a first side of the processing line and a second guide bar 136 extending along a second, opposite side of the processing line. The first and second guide bars 132 and 136 are positioned to engage an underside portion of each respective wing and hold the wing in tension relative to the corresponding breast muscle as the poultry carcass moves downstream passed the first and second blade assemblies 120 and 122. In one embodiment, each guide bar 132 and 136 includes a first guide bar portion 140 that is secured to and extends from the frame or another portion of the poultry processing machine 100/carcass separation assembly 104 and a second guide bar portion 144 that extends along a length of the processing line of the carcass separation assembly 104.

The first guide bar portion 140 may extend generally vertically or diagonally upwardly (in the downstream direction) from the frame, and the second guide bar portion 144 may extend generally horizontally along a length of the processing line from the first guide bar portion 140. The first guide bar portion 140 may extend vertically a predefined distance to position the second guide bar portion 144 to engage an underside portion of each respective wing. In that regard, the overall length or height of the first guide bar portion 140 may be adapted for the size of the poultry carcass being processed. Along those lines, the second guide bar portion 144 of the first and second guide bars 132 and 136 are spaced apart a predefined distance to accommodate the size of the poultry carcass being processed.

In one embodiment, the guide bars are defined by a single metal pipe, bar, etc., that is bent to define the first guide bar portion 140 and the second guide bar portion 144. In this manner, the intersection of the first guide bar portion 140 and the second guide bar portion 144 does not define any sharp corners or edges on which the carcass may catch, tear, etc. Moreover, openings, interfaces, etc., are minimized for optimal cleaning and sanitation. Of course, the guide bars may instead be defined by multiple pieces or members secured together.

In a further aspect, the second guide bar portion 144 may extend gradually away from a horizontal conveyance plane of the processing line as it extends in the downstream direction. At the same time, the second guide bar portion 144 may extend gradually toward a center longitudinal axis of the processing line as it extends in the downstream direction. Such a configuration causes each respective wing, when supported by the second guide bar portion 144, to be held in tension relative to the corresponding breast muscle as the poultry carcass moves downstream passed the first and second blade assemblies 120 and 122.

The wings on each side of the poultry carcass are held in tension relative to the corresponding breast muscle such that when the carcass moves downstream passed the first and second blade assemblies 120 and 122, the blade 124 of each of the first and second blade assemblies 120 and 122 engages the respective side of carcass beneath the wings and separates the corresponding breast muscle from the fan bone and any other bones (e.g., the wish bone, a rib bone, etc.).

The first and second blade assemblies 120 and 122 will now be described in detail. The first and second blade assemblies 120 and 122 are identical; and therefore, only the first blade assembly 120 will be described.

In general, the first blade assembly 120 includes a blade 124 that is moveable into and out of engagement with a poultry carcass as it moves past the first blade assembly 120. In the depicted embodiment, the blade 124 that is moveable into and out of engagement with a poultry carcass with an actuator assembly 148. For instance, the actuator assembly 148 may include a linear actuator 152 having a cylinder 154 and a piston 156, with the closed end of the cylinder 154 pivotally secured to the frame or another portion of the poultry processing machine 100/carcass separation assembly 104. The piston 156, which selectively extends from the cylinder 154 when the linear actuator 152 is activated, is pivotally coupled a blade support frame 158, which is pivotally secured to the poultry processing frame at a pivot point 162. When the actuator assembly 148 is activated, the piston 156 moves the blade 124 into or out of engagement with the side of the carcass.

Figure 7B:
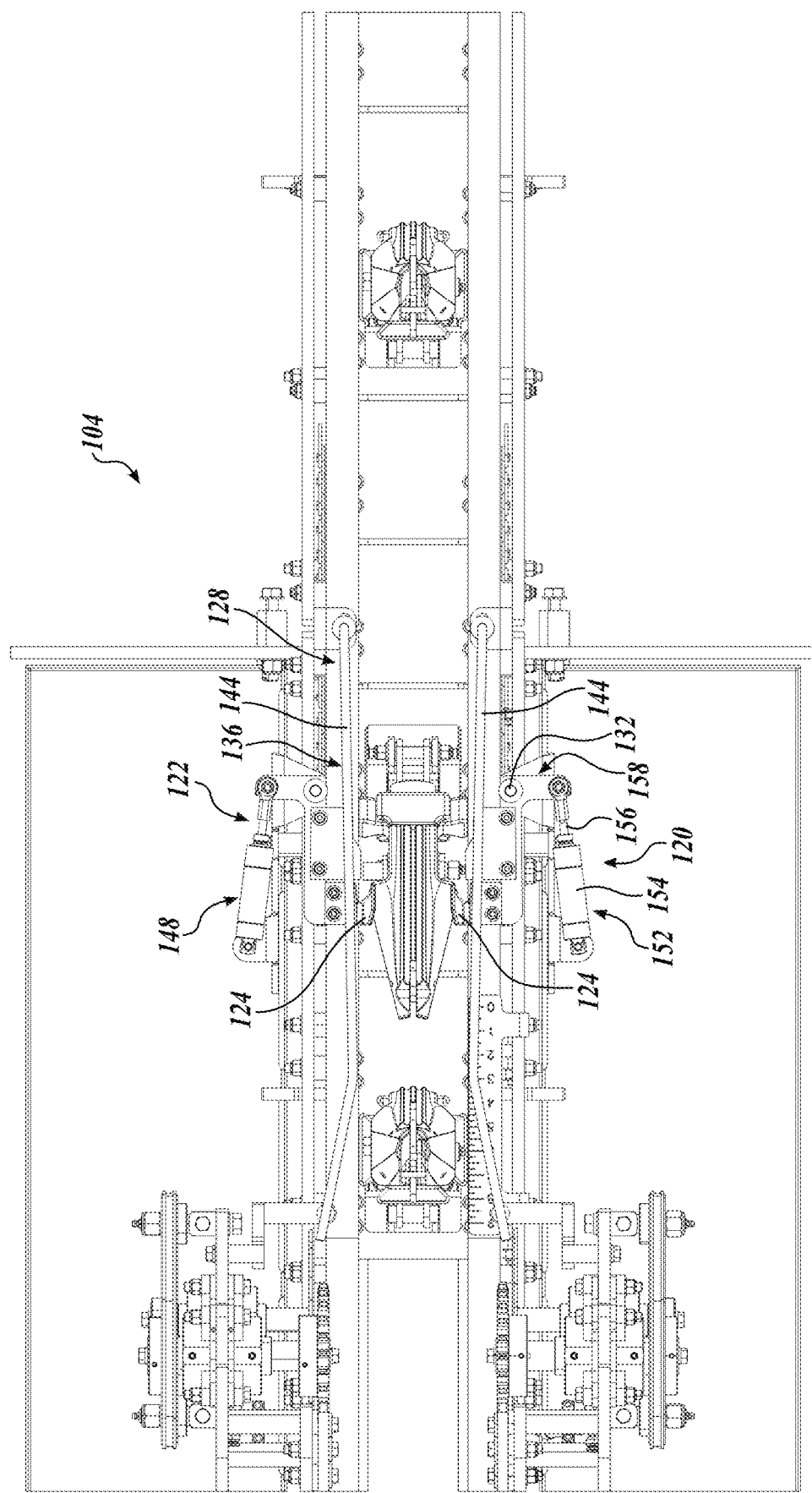
FIG. 7B shows a top view of the carcass separation assembly of FIG. 1, wherein blades of the carcass separation assembly are shown in an engaged position.

More particularly, from a disengaged position as shown in FIG. 7A, the piston 156 retracts into the cylinder 154 to pivot the blade support frame 158 clockwise about its pivot point 162. As the blade support frame 158 moves clockwise about its pivot point 162, the blade 124 moves into engagement with the side of the carcass, as shown in FIG. 7B. The piston 156 retracts into the cylinder 154 a specified length, as determined by the position of the side of the carcass, to locate the blade 124 in an engagement position with the carcass.

From the engaged position shown in FIG. 7B, the piston 156 extends from the cylinder 154 to pivot the blade support frame 158 counterclockwise about its pivot point 162. As the blade support frame 158 moves counterclockwise about its pivot point 162, the blade 124 moves out of engagement with the side of the carcass (a "disengaged position"), as shown in FIG. 7A. The disengaged position may be defined as being spaced from the exterior of the carcass (including the separated breast) after breast separation. In this manner, the blade 124 does not interfere with any trailing portions of the carcass as it moves past the blade 124.

The engaged and disengaged positions of the blade 124 may be defined at least in part by considering known size values of a poultry carcass before and/or after breast separation. For instance, width values of different portions of a poultry carcass may be used to determine optimal engaged and disengaged positions of the blade 124 for that poultry type. The width values may include the average width of the entire carcass across the carcass rib cage area (e.g., from the skin outer surface on a first side of the carcass at the rib cage to the skin outer surface on a second side of the carcass at the rib cage) and the average width of the skeletal frame across the carcass rib cage area (e.g., from the outermost rib bones on a first side of the carcass to the outermost rib bones on a second side of the carcass). Other values may also be used.

The engaged position of each blade 124 may be just outside the outermost rib bones on each side of the carcass (to facilitate insertion near the breast muscle attachment to the rib cage area), and the disengaged position of each blade 124 may be a position that is spaced from the outermost portion of the carcass tissue (e.g., the skin exterior surface) at the rib cage area (such that the blade 124 does not interfere with any trailing portions of the carcass as it moves past the blade 124).

It should be appreciated that any other suitable actuator assembly may instead be used to move the blade 124 into and out of engagement with the carcass.

The blade 124 will now be described with particular reference to FIGS. 10A-10H, although certain aspects may also be understood by referring to FIGS. 6-9 and 11-12E. As noted above, the blade 124 is configured to separate the breast muscle from the carcass bones, such as the fan bone, the wish bone, a rib bone, etc., on a corresponding side of the poultry carcass as the poultry carcass moves downstream passed the blade 124. In general, the blade 124 is shaped, sized, and configured to separate the breast muscle from the carcass with a shearing force rather than cutting/slicing or fully tearing the breast muscle from the carcass.

In the depicted embodiment, the blade 124 includes a body 166 that may be made of stainless steel or any other suitably rigid and food-safe material. The body 166 includes a first end 170 opposite a second end 172, wherein the first end 170 extends from the blade support frame 158 of the actuator assembly 148. For instance, the body 166 may extend upwardly from a substantially transverse mounting portion 176 that attaches to the blade support frame 158.

Figure 8A:
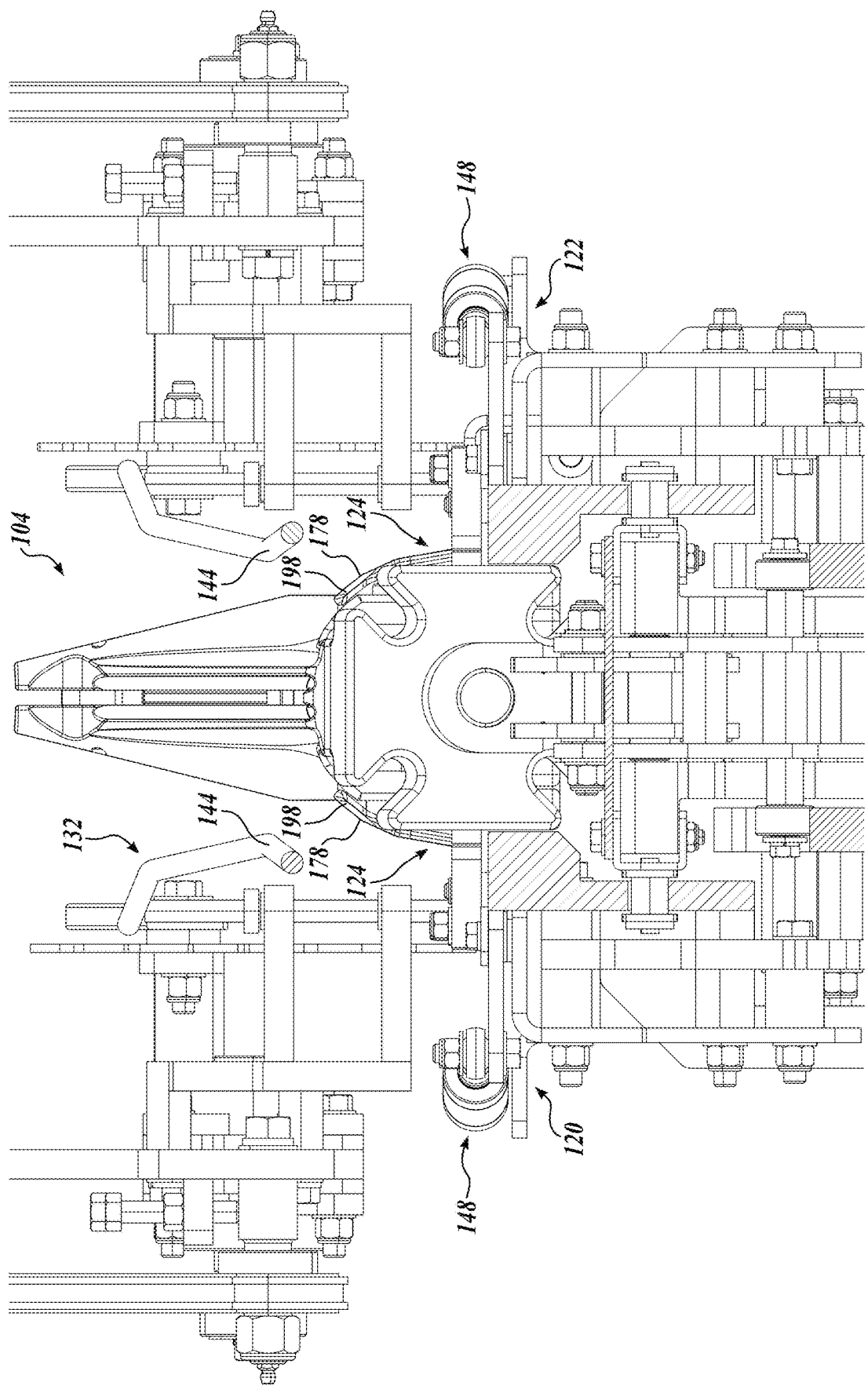
FIG. 8A shows a partial cross-sectional front view (viewing downstream) of the carcass separation assembly of FIG. 1, wherein blades of the carcass separation assembly are shown in an engaged position.
Figure 8B:
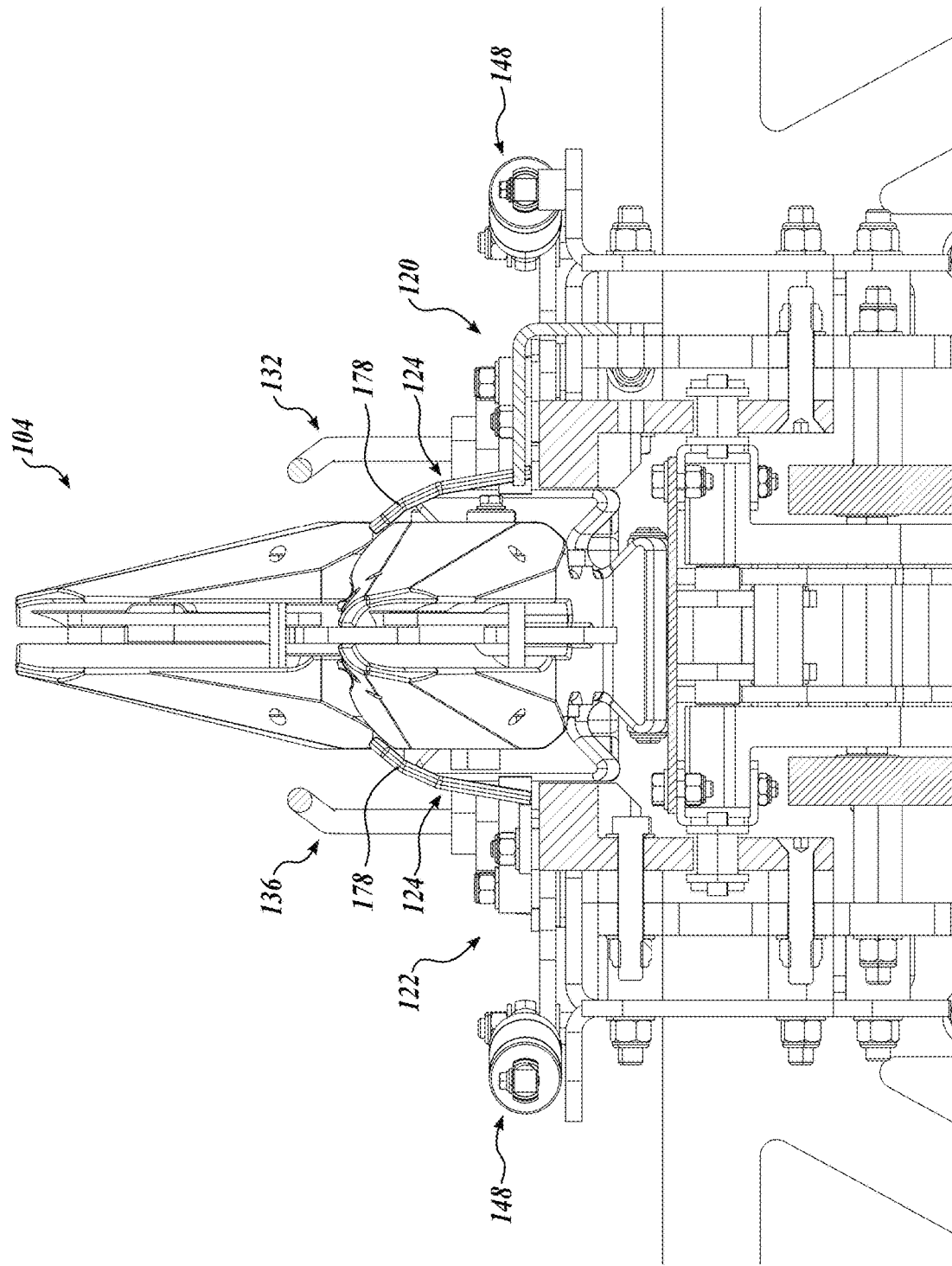
FIG. 8B shows a partial cross-sectional front view (viewing upstream) of the carcass separation assembly of FIG. 1, wherein blades of the carcass separation assembly are shown in an engaged position.
Figure 9B:
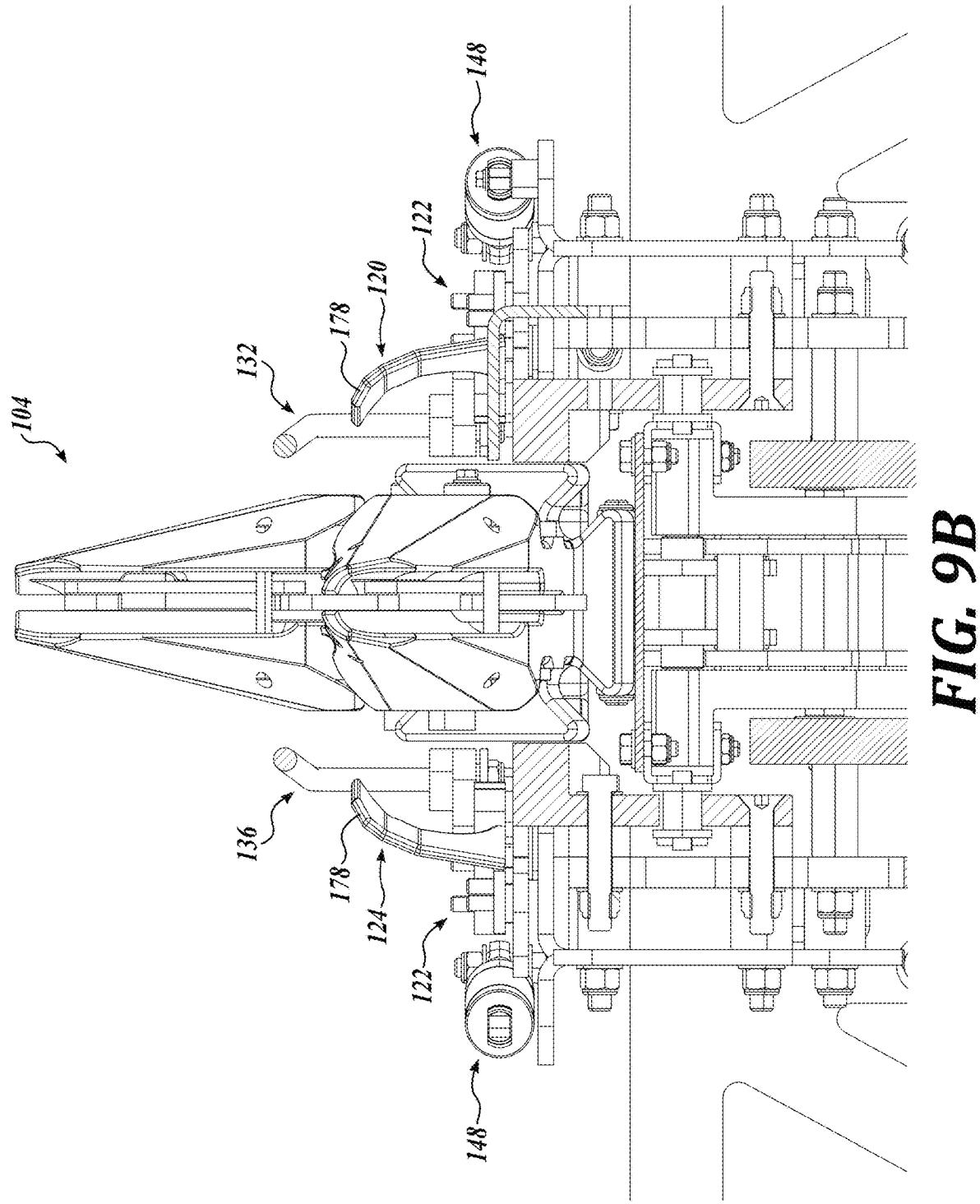
FIG. 9B shows a partial cross-sectional front view (viewing upstream) of the carcass separation assembly of FIG. 1, wherein blades of the carcass separation assembly are shown in a disengaged position.
Figure 10A:
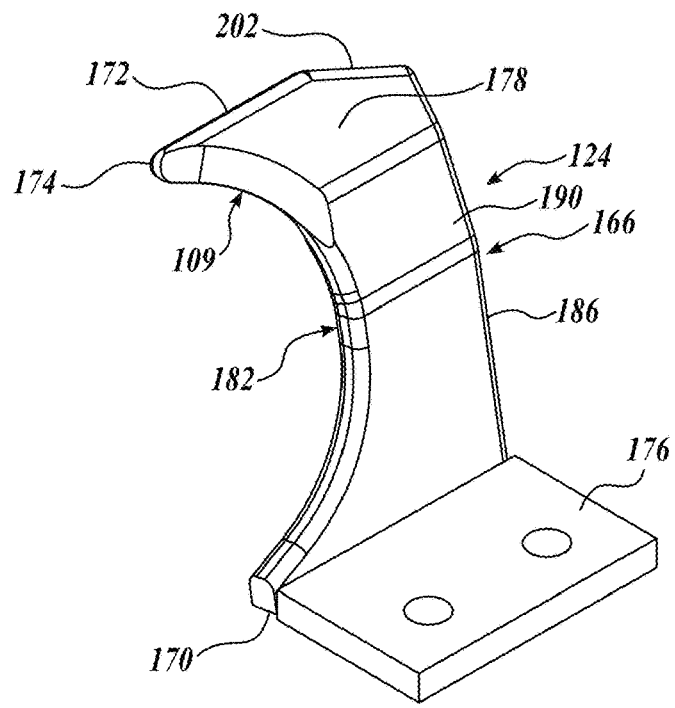
FIG. 10A shows a first perspective view of a blade of the carcass separation assembly of FIG. 1.
Figure 10B:
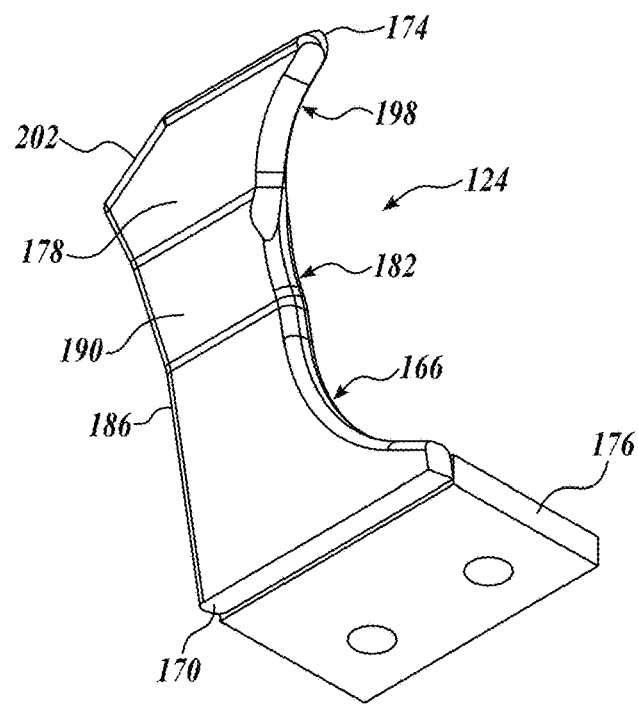
FIG. 10B shows a second perspective view of the blade of FIG. 10A.
Figure 10C:
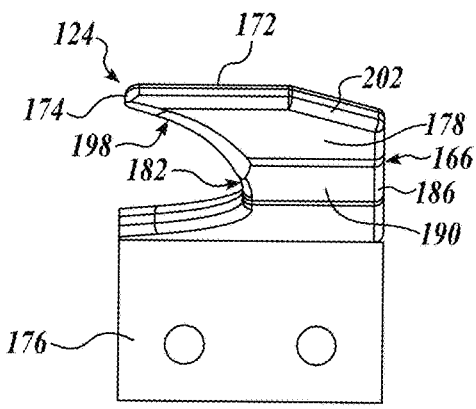
FIG. 10C shows a top view of the blade of FIG. 10A.
Figure 10D:
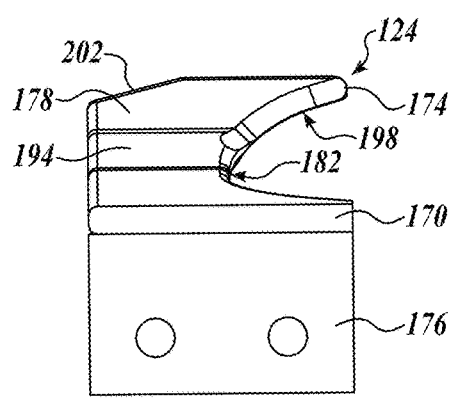
FIG. 10D shows a bottom view of the blade of FIG. 10A.
Figure 10E:
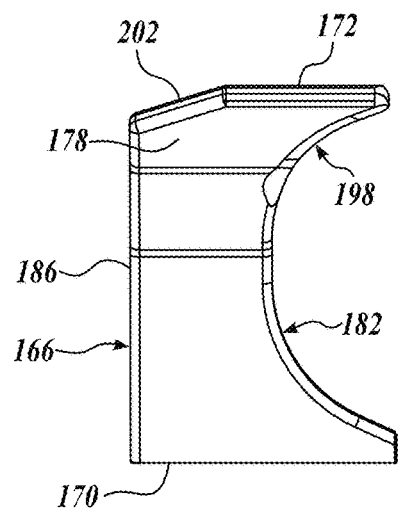
FIG. 10E shows a left side view of the blade of FIG. 10A.
Figure 10F:
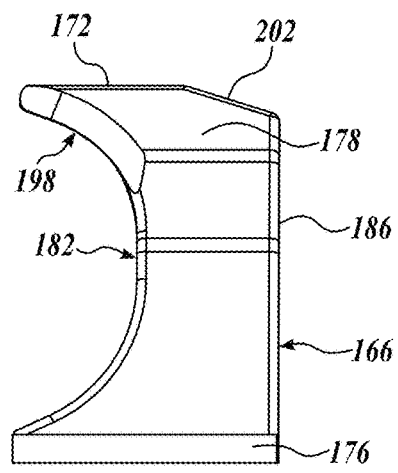
FIG. 10F shows a right side view of the blade of FIG. 10A.
Figure 10G:
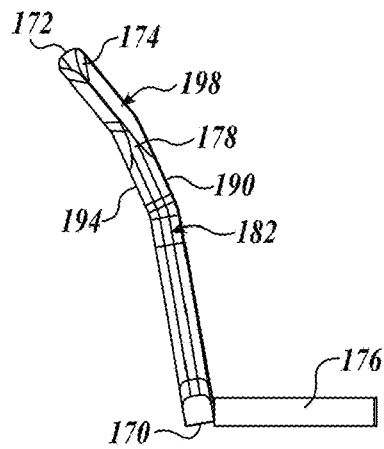
FIG. 10G shows a front view of the blade of FIG. 10A.
Figure 10H:
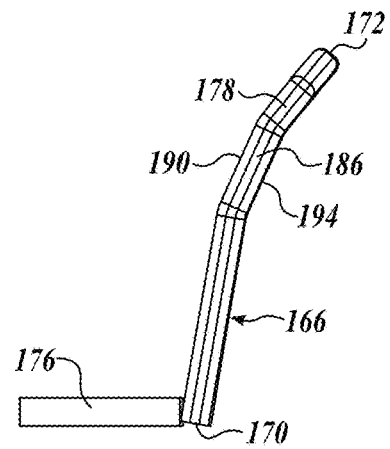
FIG. 10H shows a rear view of the blade of FIG. 10A.

The second end 172 defines a second edge 174 that extends generally parallel to the longitudinal axis of the processing line when the blade 124 is in an engaged position (see FIG. 8A). Preferably, the second edge 174 is rounded or otherwise contoured such that it does not define a sharp edge that could inadvertently slice or cut the carcass.

At least a portion of the body 166 extending between the first and second ends 170 and 174 is shaped to substantially correspond to a shape of a portion of the first side of the poultry carcass. In the depicted embodiment, an upper portion 178 of the body 166 extending from the second end 172 toward the first end 170 is shaped to substantially correspond to the shape of the portion of the side of the poultry carcass (see FIGS. 8A and 8B). For instance, the upper portion 178 may be generally curved to substantially match the contour of the side of the poultry carcass. In some embodiments, the entire body 166 curves generally upwardly and outwardly from the substantially transverse mounting portion 176 to correspond to the shape of the portion of the side of the poultry carcass.

A curved upstream edge 182 extends between at least a portion of the first and second ends 170 and 174 of the body 166, facing upstream of the processing line when the blade 124 is in the engaged position. A downstream edge 186 is defined opposite the curved upstream edge 182 and faces downstream of the processing line when the blade 124 is in the engaged position. In that regard, the body 166 extends between the first end 170, the second end 174, the curved upstream edge 182, and the downstream edge 186. An outer, generally convex surface 190 extends between the first end 170, the second end 174, the curved upstream edge 182, and the downstream edge 186 opposite a corresponding inner, generally concave surface 194. In that regard, the body 166 can be configured to have an overall flattened, curved hook shape. The overall flattened, curved hook shape of the blade 124 enables the blade 124 to engage and penetrate the carcass at a specific location or area for starting the shearing process of the breast muscle from the carcass bones. The body also has a thickness extending between the inner and outer surfaces 190 and 194 that is suitable for fitting between the breast muscle and the rib cage area of the carcass during shear separation.

Figure 11:
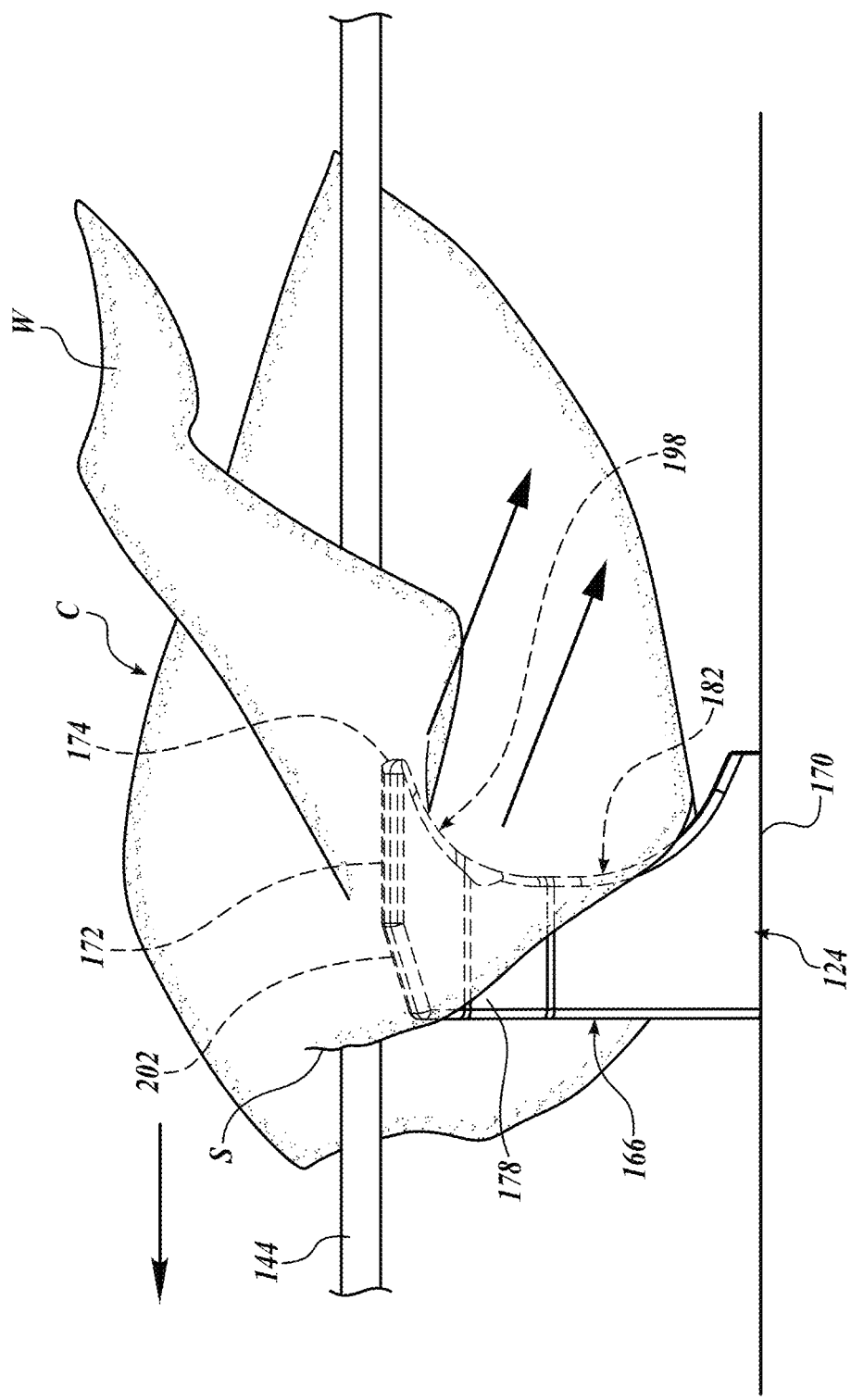
FIG. 11 shows a side view of the blade of FIG. 10A being used to separate a breast muscle from a poultry carcass.

To facilitate insertion of the blade 124 between the breast muscle and the rib cage area of the carcass, the body 166 may include a carcass-engaging tip 174 defined at the intersection of the second end 172 of the body 166 and the curved upstream edge 182. The carcass-engaging tip 174 points upstream and is configured to engage and penetrate the carcass at the desired carcass location/area for starting the shearing process of the breast muscle. In the depicted embodiment, the carcass-engaging tip 174 penetrates the carcass near a shoulder attachment area of the breast muscle. More specifically, when the carcass is in a substantially horizontal orientation with the breast facing up, as shown in FIG. 11, the carcass-engaging tip 174 penetrates the carcass inside the shoulder cut near the top of the breast muscle. The carcass-engaging tip 174 is generally rounded so as to facilitate insertion of the blade 124 into the carcass body without cutting or significantly tearing any tissue of the carcass.

Once the blade 124 penetrates the carcass, the blade separates the breast muscle from the carcass with a shearing force as the carcass moves past the blade in a downstream direction. To facilitate shear separation of the breast muscle from the carcass, the blade 124 includes a shearing edge portion 198 defined along at least a portion of the curved upstream edge 182, such as along the upper portion 178 of the body 166. The shearing edge portion 198 is generally configured to separate the breast muscle from the carcass with a shearing force rather than a cutting or tearing force as the carcass moves past the blade in a downstream direction.

In the depicted embodiment, the shearing edge portion 198 is defined as a tapered edge of the curved upstream edge 182. As noted above, the shearing edge portion 198 is generally configured to separate the breast muscle from the carcass with a shearing force rather than a cutting or tearing force. In that regard, the tapered edge of the shearing edge portion 198 defines a shearing edge that is that is sufficiently sharp to penetrate tissue of the poultry carcass but sufficiently dull to substantially prevent the shearing edge from cutting the tissue of the poultry carcass.

It should be appreciated that all other edges of the blade 124 may be generally rounded, curved, tapered, etc., to substantially prevent the blade 124 from cutting, tearing, or otherwise catching on or damaging the carcass tissue as the breast muscle is separated from the carcass. For instance, a tapered corner 202 may be defined between the second end 172 and the downstream edge 186 rather than a substantially sharp corner.

Referring to FIG. 11, a description of the shearing separation of breast muscle from a carcass C will now be described. The blade 124 engages the carcass initially in the shoulder cut opening S, which as described above, is done upstream of the carcass separation assembly 104. The carcass-engaging tip 174 guides the blade 124 into penetrating engagement with the carcass C near a shoulder attachment area of the breast muscle.

The blade 124 is engaged with the carcass C with the wing W of the carcass held outwardly and upwardly from the carcass body by the second guide bar portion 144 of the tensioning assembly 128. As the carcass C is moved downstream past the blade 124, the blade 124 shears a top of the breast muscle from the carcass C before shearing lower portions of the breast muscle. In effect, the curved shape of the shearing edge portion 198 generally shears the top of breast muscle from the carcass C diagonally downwardly across the carcass body.

To facilitate the generally diagonally downwardly shearing of the breast muscle across the carcass body, the shearing edge portion 198 between a center of the blade body 166 and the second end 172 may have a suitable radius of curvature. Such a configuration allows a top of the shearing edge portion 198 (i.e., near the second end 172 of the blade 124) to initiate a shearing force near a shoulder attachment area of the breast muscle. After initiation of the shearing force, the top of the shearing edge portion 198 shears the breast muscle away from the carcass bones as the carcass C moves downstream past the blade 124.

As the carcass C continues to move downstream past the blade 124, lower portions of the shearing edge portion 198 start shearing the breast muscle away from the carcass bones. In other words, the shearing edge portion 198 gradually shears the breast muscle away from the carcass bones as the shearing edge portion 198 engages the carcass along its arced length. The blade 124 continues to shear the breast muscle away from the carcass bones in this manner, with the top of the shearing edge portion 198 shearing an upper portion of the breast muscle away from the carcass bones before a lower portion of the shearing edge portion 198 shears a corresponding lower portion of the breast muscle away from the carcass. In effect, the blade 124 generally shears the breast muscle away from the bones of the carcass C in a diagonally downwardly fashion across the carcass body as noted above.

The bottom portion of the curved upstream edge 182 of the blade 124 (not separately labeled) may have substantially the same radius of curvature as the upper shearing edge portion 198. However, the bottom portion of the curved upstream edge 182 of the blade 124 need not include a tapered shearing edge as defined on the shearing edge portion 198. Rather, the bottom portion of the curved upstream edge 182 of the blade 124 may be curved to reduce any shearing or tearing effects of the bottom portion of the curved upstream edge 182 of the blade 124. Regardless, the curved nature of the bottom portion of the curved upstream edge 182 of the blade 124 may help facilitate separation of the carcass skin during breast muscle separation. In this manner, the breast muscle can be easily removed downstream at the breast muscle removal station/area.

Figure 12A:
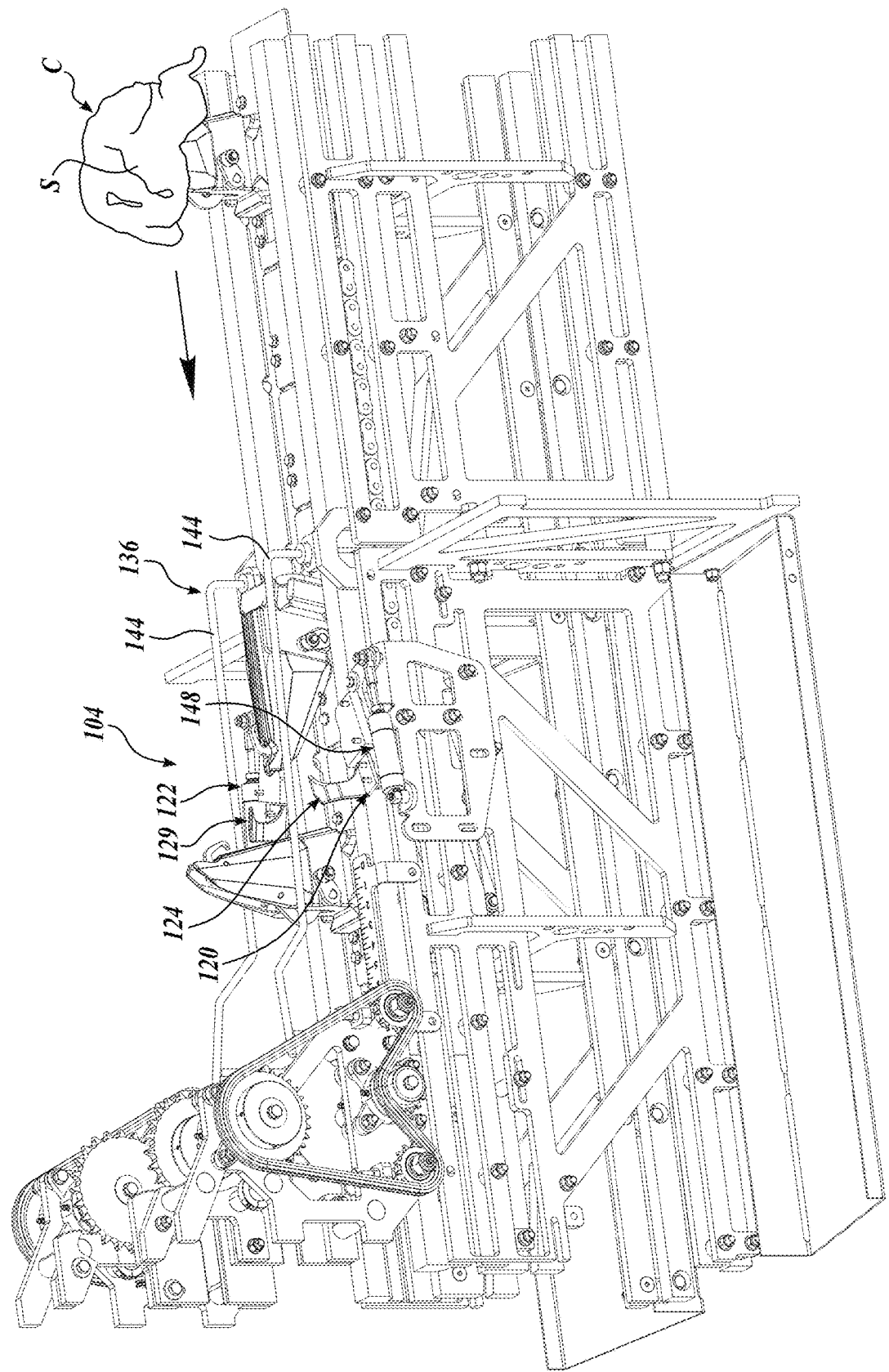
FIG. 12A shows a perspective view of the carcass separation assembly of FIG. 1, wherein a carcass is shown disposed on a cone of a conveyor assembly moving toward the carcass separation assembly, and wherein blades of the carcass separation assembly are shown in a disengaged position.

An exemplary method of separating a breast muscle from a poultry carcass will now be described with reference to FIGS. 12A-12E. Referring first to FIG. 12A, a poultry carcass C is disposed on a vertically oriented cone near the entry end 112 of the poultry processing machine 100 either before or after shoulder cuts are made. The cone together with the carcass C moves along the conveyance path of the poultry processing machine 100 towards the carcass separation assembly 104.

Figure 12B:
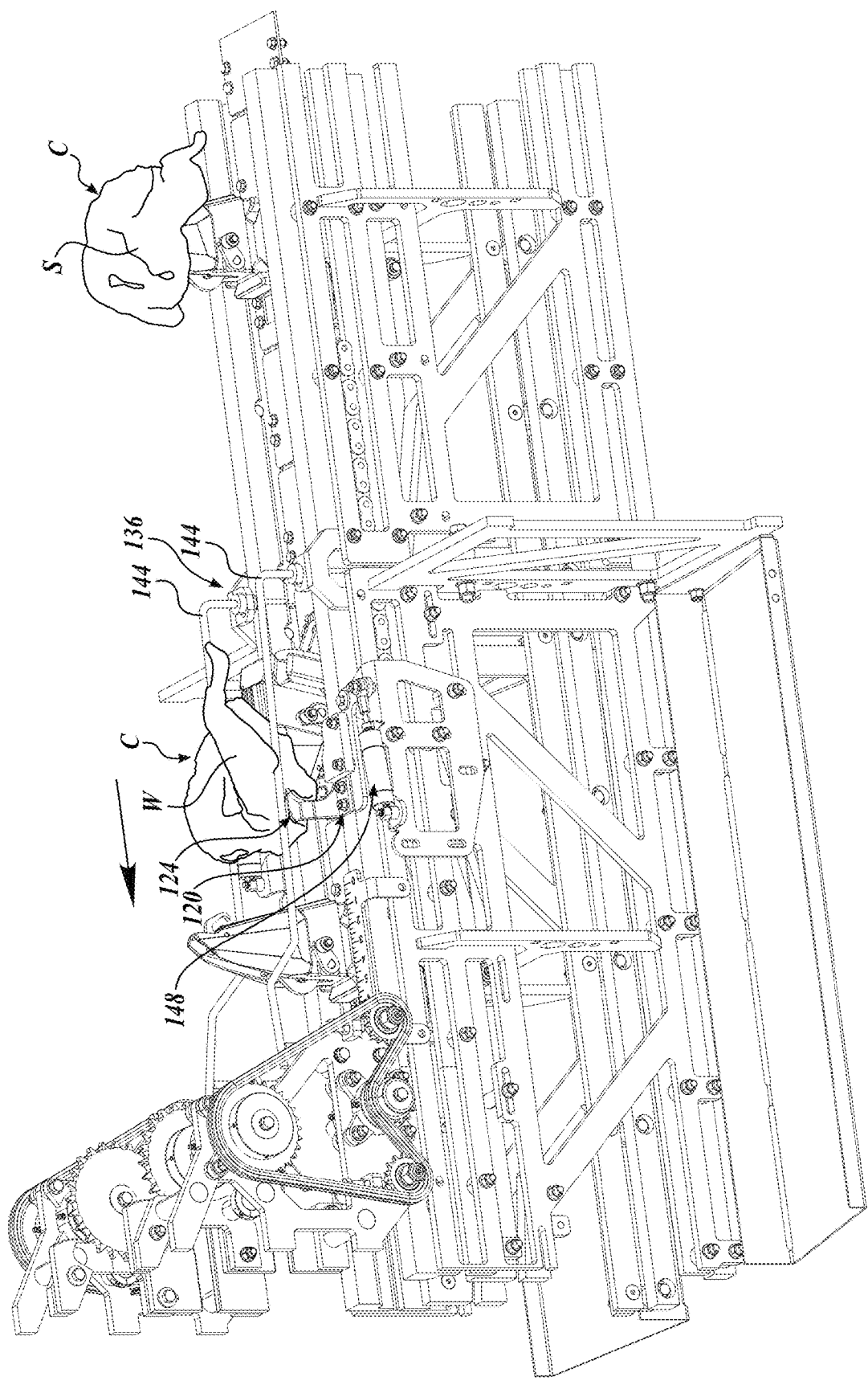
FIG. 12B shows a perspective view of the carcass separation assembly of FIG. 12A, wherein the carcass disposed on the cone is being initially engaged by blades of the carcass separation assembly.

Referring to FIG. 12B, the carcass C may engage the tensioning assembly 128 of the carcass separation assembly 104 as the cone carrying the carcass C is moved into a substantially horizontal orientation, e.g., with the breast of the carcass facing up. In this manner, as the carcass C is moved counterclockwise with the cone into a substantially horizontal orientation, the second guide bar portion 144 catches the wing W of the carcass C and holds it upwardly and outwardly relative to the carcass body. The second guide bar portion 144 may lift and support the wings of the poultry carcass C in tension as they are held in a spaced apart relationship relative to the breast muscle.

As the carcass C is moved along the conveyance path towards the first and second blade assemblies 120 and 122, the actuator assembly 148 is activated to move the corresponding blade 124 into an engaged position. The actuator assembly 148 may be activated when the cone carrying the carcass C reaches a designated linear position along the conveyance path. For instance, the actuator assembly 148 may be activated to move the corresponding blade 124 into an engaged position just before the carcass C reaches the blade. The conveyance path location for actuator activation may be determined by any suitable means, such as by using one or more sensors (e.g., a linear encoder) to detect the location of at least one cone moving along the poultry processing machine 100 in relation to a blade-engaging position. The sensor, such as a linear encoder, may output one or more signals to a controller of the carcass separation assembly 104 and/or the actuator assembly 148 for activating the linear actuator 152 to engage or disengage the blade 124.

Still referring to FIG. 12B, with the blade 124 in an engaged position, the carcass-engaging tip 174 of the blade 124 penetrates the shoulder cut area S of the carcass C. More specifically, the carcass-engaging tip 174 guides the blade 124 into penetrating engagement with the carcass C near a shoulder attachment area of the breast muscle.

Figure 12C:
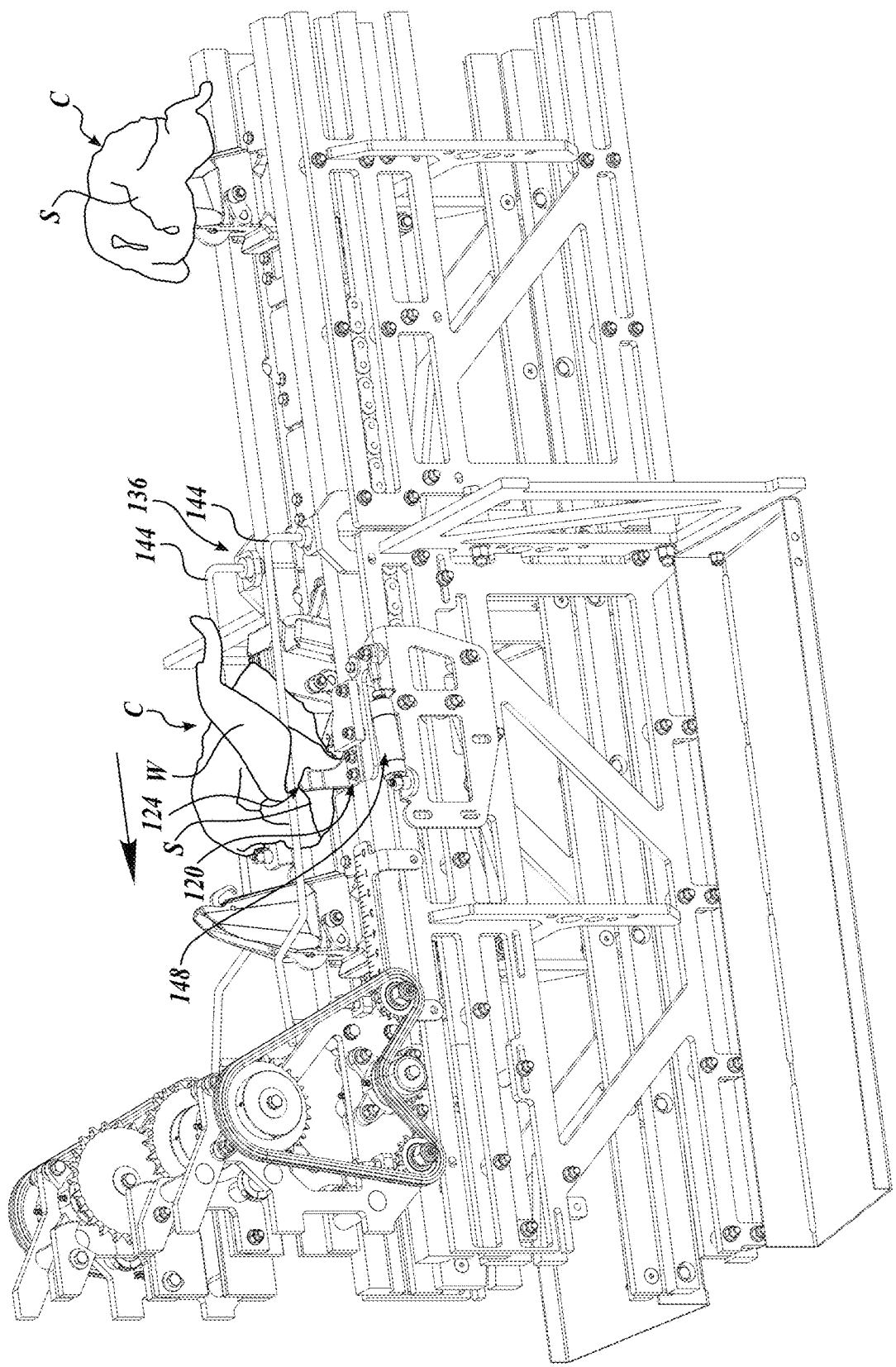
FIG. 12C shows a perspective view of the carcass separation assembly of FIG. 12B, wherein the carcass disposed on the cone is being further engaged by blades of the carcass separation assembly.
Figure 12D:
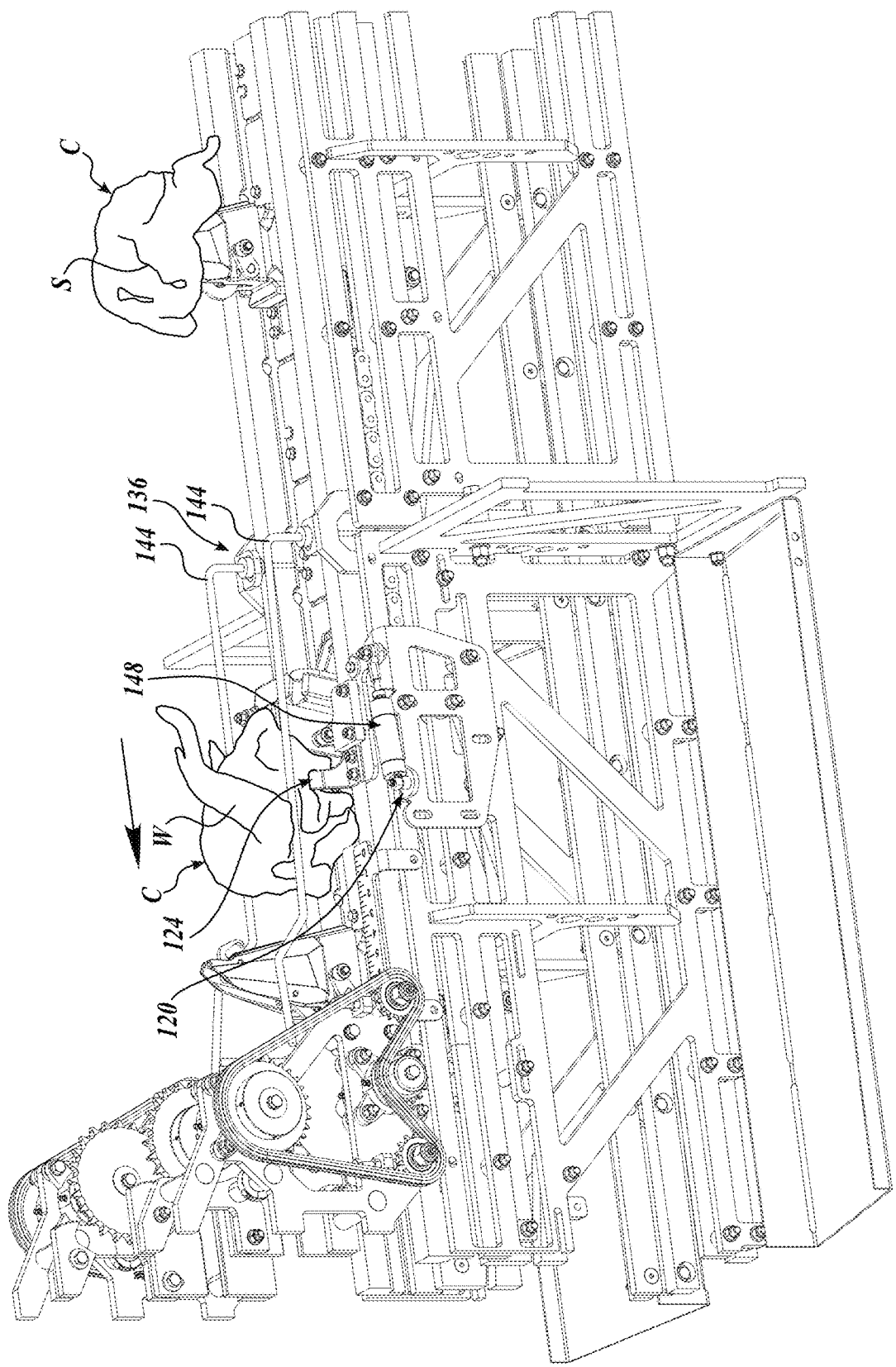
FIG. 12D shows a perspective view of the carcass separation assembly of FIG. 12C, wherein the carcass disposed on the cone is being further engaged by blades of the carcass separation assembly.

Referring to FIG. 12C, as the carcass C is moved downstream past the blade 124, the blade 124 starts to shear a top of the breast muscle from the bones of the carcass C, as described above. Referring to FIG. 12D, the blade 124 continues to shear the breast muscle from the carcass C in a generally diagonally downward manner, e.g., with the top portion of the shearing edge portion 198 shearing the top portion of the breast muscle away from the carcass before the lower portions of the breast muscle are sheared away. The carcass C moves past the blade 124 until the entire breast muscle is substantially sheared away from the carcass C.

Figure 12E:
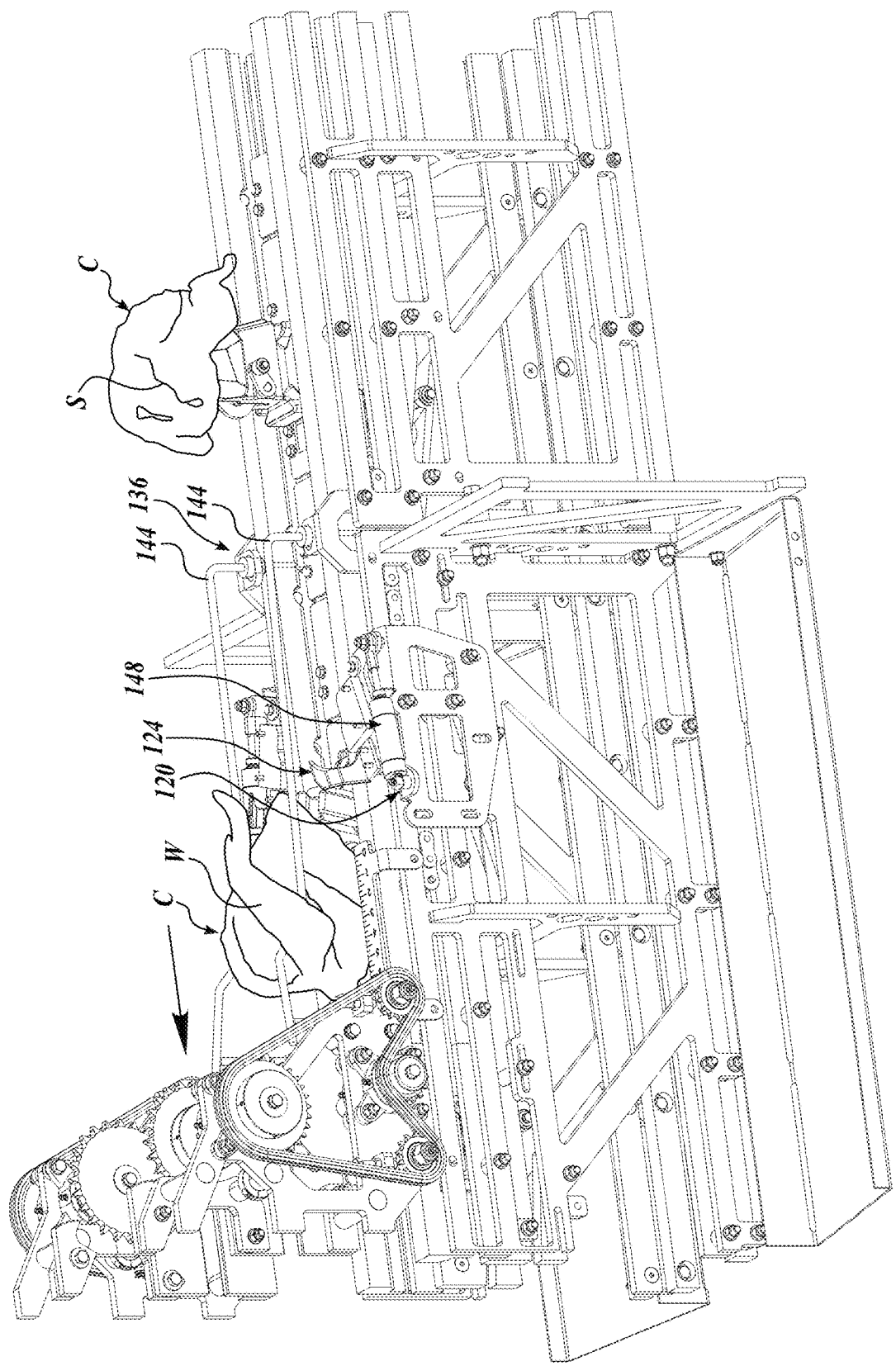
FIG. 12E shows a perspective view of the carcass separation assembly of FIG. 12D, wherein the carcass disposed on the cone has moved passed the carcass separation assembly and the blades of the carcass separation assembly are in the disengaged position.

Referring to FIG. 12E, after breast muscle shearing is complete and the carcass moves downstream passed the blade 124, the cone carrying the carcass C may be moved back into a substantially vertical orientation (if needed for the next steps of the processing line, such as breast removal). Moreover, the actuator assembly 148 may be activated to move the corresponding blade 124 into a disengaged position. The actuator assembly 148 may be activated when the cone carrying the carcass C reaches a designated linear position along the conveyance path past the blade 124. For instance, the actuator assembly 148 may be activated to move the corresponding blade 124 into a disengaged position just after the carcass C passes the blade. The conveyance path location for actuator activation may be determined by any suitable means as discussed above (e.g., a linear encoder). It should be appreciated that in some embodiments, the blade 124 is continuously maintained in an engaged position and moves into an out of engagement with a carcass as it moves past the blade.

By using the system and methods described herein, the breast muscle is separated from each side of the carcass with substantially no bones attached to the breast muscle, without leaving substantial muscle tissue attached to the carcass bones, and without significantly damaging the breast muscle (such as by separating with tearing). For instance, using the system and methods described herein, the inventors found that the breast muscle is separated from each side of the carcass without any bones attached to the breast muscle about 95% of the time. Furthermore, in most instances, the breast muscle is separated from the carcass without leaving substantial muscle tissue attached to the carcass bones.

In that regard, the blade 124 (together with the tensioning assembly 128) is configured to shear the breast muscle away from the carcass skeleton by essentially facilitating a peeling effect of the breast muscle away from the carcass. More specifically, as the carcass C moves past the blade 124 with the wings W supported/held up by the tensioning assembly 128, the blade 124 separates the connective tissue between the breast muscle and the carcass bones, such as the fan bone. In other words, the blade 124 breaks up or otherwise relieves the surface tension in the adhesions (e.g., facia, membranes, etc.) between the breast muscle and the carcass bones. In effect, the breast muscle, which is slightly pulled upwardly and outwardly by the wings W supported/held up by the tensioning assembly 128, peels/shears off the carcass bones.

Moreover, as noted above, the blade 124 shears the breast muscle from the carcass C in a generally diagonally downward manner. As can be seen in FIG. 3, the fan bone extends generally diagonally downward from the sternum/keel along the poultry carcass. In that regard, each breast muscle is peeled/sheared away from the corresponding fan bone generally along its length, substantially from the thin end of the fan bone to the enlarged end of the fan bone. Peeling/shearing the breast muscle from the carcass C in a generally diagonally downward manner helps minimize any pulling forces on the fan bone, which therefore minimizes the possibility of the fan bone breaking off or otherwise being pulled off with the breast muscle during breast muscle separation.

Figure 13:
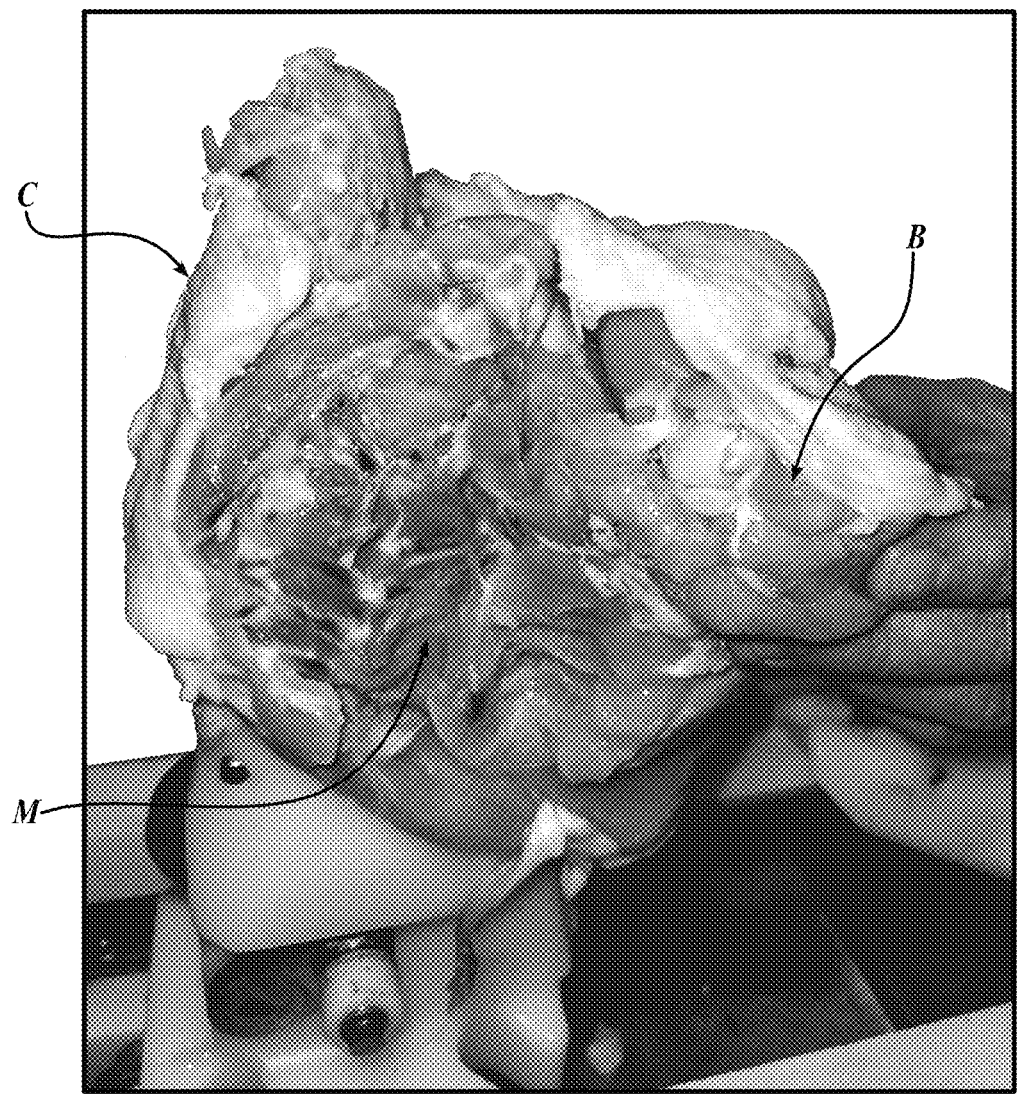
FIG. 13 shows a photograph of a chicken carcass having a breast separated using a carcass separation assembly according to exemplary embodiments of the present disclosure.

FIG. 13 depicts an image of a carcass C having the breast muscle separated from a side of the carcass using the system and methods described herein. In this sample case, the breast muscle was separated from the carcass with no bones attached to the breast muscle and without significant damage to the breast muscle tissue. Further, the muscle M left attached to the bones of the carcass C was minimal, as can be seen by comparing to the muscle M left attached to the bones of the carcass C of FIG. 4. Accordingly, it can be appreciated that by using the system and methods described herein, the breast muscle can be optimally separated from a poultry carcass for later removal from the carcass.

Figure 14:
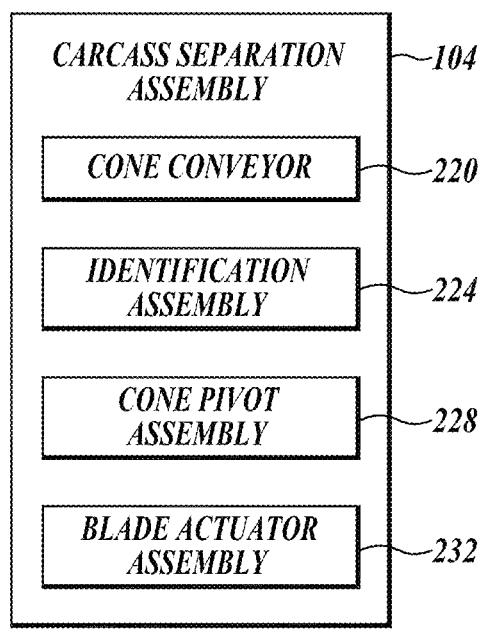
FIG. 14 shows a block diagram of a non-limiting example embodiment of a carcass separation assembly according to exemplary embodiments of the present disclosure.

Referring to FIG. 14, an exemplary schematic view of the carcass separation assembly 104 is depicted. The carcass separation assembly 104 may include a cone conveyor 220 (which may be part of the poultry processing machine 100), an identification assembly 224 for identifying at least one of a size, shape, contour, and type of poultry carcass, a cone pivot assembly 228 configured to pivot the cones carrying the carcass C between a substantially vertical and a substantially horizontal orientation, and a blade actuator assembly 232 for moving the blade 124 into and out of engagement with the carcass, which may be substantially identical to the actuator assembly 148 described above.

Figure 15:
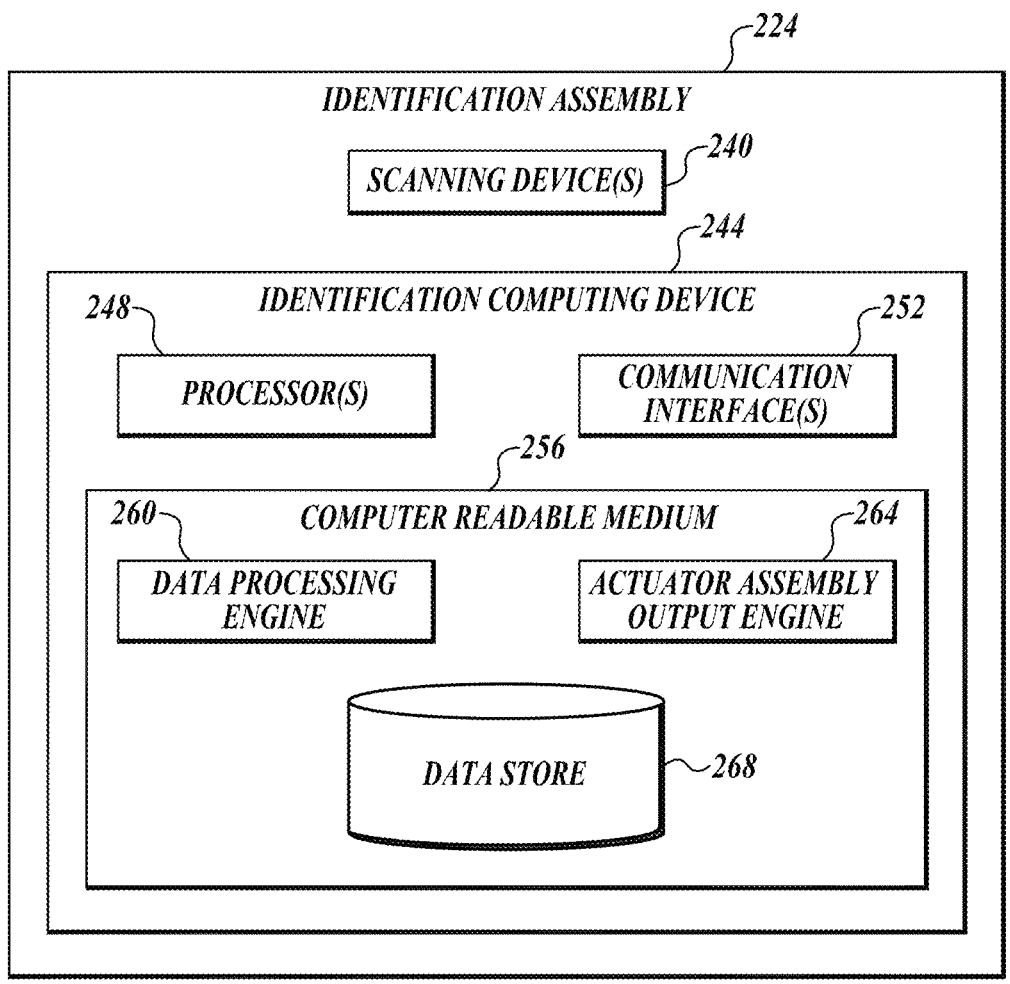
FIG. 15 shows a block diagram of a non-limiting example embodiment of an identification assembly of the carcass separation assembly according to exemplary embodiments of the present disclosure.

Referring to FIG. 15, an exemplary schematic view of the identification assembly 224 of the carcass separation assembly 104 is depicted. As noted above, the identification assembly 224 may be configured for identifying at least one of a size, shape, and type (e.g., chicken, turkey, quail, etc.) of a poultry carcass. Such identification may be useful, for instance, in determining at least one of the blade engaging and disengaging positions discussed above. Using data gathered and processed by the identification assembly 224, the blade actuator assembly 232 may be activated to move the blade 124 into an optimal engaging position to separate the breast muscles of a carcass as well as into an optimal disengaged position that minimizes interference of the blade 124 with a trailing portion of the carcass as it moves past the blade after breast separation.

In that regard, the identification assembly 224 may include a computing device, such as an identification computing device 244 having a processor(s) 248, a communication interface(s) 252, a computer readable medium 256, and one or more data stores 268. The computer-readable medium 256 has stored thereon logic that, in response to execution by the one or more processor(s) 248, cause the identification computing device 244 to provide a data processing engine 260 and an actuator assembly output engine 264.

In one embodiment, the data processing engine 260 is configured to process known size values of a poultry carcass before and/or after breast separation, as discussed above. For instance, width values of different portions of a poultry carcass, as discussed above, may be processed by the data processing engine 260 to determine an optimal engaged and disengaged position of the blade 124 for the poultry type associated with the processed values. In that regard, the data store 268 may store known size values of a type of poultry carcass or other data associated with a type of poultry carcass that may be retrieved by the data processing engine 260. The data processing engine 260 may output one or more signals indicative of processed values (e.g., the average width of the entire carcass across the carcass rib cage area, the average width of the skeletal frame across the carcass rib cage area, etc.). The data processing engine 260 may output the one or more signals to the actuator assembly output engine 264 for activating the linear actuator 152 to move the blade 124 into the desired engaged or disengaged position.

In another embodiment, the identification assembly 224 may further include a scanning device(s) 240 that is in communication with the identification computing device 244. The scanning device(s) 240 may be generally configured to capture one or more images of a carcass as it passes the scanning device(s) 240. The image data may be processed by the data processing engine 260 for determining at least one of the size, shape, contour, and type of poultry carcass. In that regard, scan data generated by the scanning device(s) 240 may be used to generate known size values of various poultry carcass types, which may be stored in the one or more data stores 268. A continuous feedback loop may be used to improve the accuracy of the known size values of various poultry carcass types based on the received/processed scan data (e.g., poultry carcasses may be continuously scanned on the poultry processing machine 100 and the processed data can be used to adjust the size values of various poultry carcass types).

The scanning device(s) 240 may include an X-ray scanner and an optical scanner, and/or any other suitable scanners.

The X-ray scanner may be any configuration for generating X-ray images suitable for use in carrying out necessary functions of the identification assembly 224. Generally, X-rays are attenuated as they pass through an object in proportion to the total mass of the material through which the X-rays pass. The intensity of the X-rays (originating from an X-ray source) received at an X-ray detector after they have passed through an object such as a poultry carcass is therefore inversely proportional to the density of the object. For example, X-rays passing through a poultry carcass bone, which have a relatively higher density than the carcass flesh or tissue, will be more attenuated than the X-rays that pass only through the flesh of the carcass. Thus, X-rays are suited for detecting the location of the poultry carcass bones.

A general description of the nature and use of X-rays in processing workpieces can be found in U.S. Pat. No. 5,585,605, entitled "Optical-scanning system employing laser and laser safety control", U.S. patent Ser. No. 10/654,185, entitled "Cutting/portioning using combined X-ray and optical scanning", as well as U.S. patent Ser. No. 10/721,947 (referenced above), incorporated herein by reference in their entirety. The signals generated by the X-ray detector are transmitted to the data processing engine 260 of the identification computing device 244, which processes the signals for identifying at least one of a size, shape, contour, or type of the poultry carcass, or performing another processing or identification step.

After the carcass has been scanned at X-ray scanning station, it may be moved by a conveyor such that it passes beneath a second scanner, such as the optical scanner. The optical scanner may be configured to illuminate the carcass by one or more light sources, capture an optical image, such as a visible light image of the carcass, and transmit the image(s)/data to the scanning data processing engine 260.

The optical scanner may utilize a variety of different scanning technologies in the visible light as well as hyperspectral range. Scanning with the optical scanner can be carried out using a variety of techniques, such as the techniques shown and described in U.S. patent Ser. No. 10/654,185 as well as U.S. patent Ser. No. 10/721,947 (referenced above), incorporated by reference herein. Moreover, the optical scanner can be configured to capture data used to generate a variety of images, such as greyscale images (e.g., images based on a color value from 0-256; grey tones seen by a laser), height maps (which can be generated by assigning a greyscale color to a height value), a fat recognition (FRS) object view (showing fat streaks within the carcass), a laser scatter image, a hyperspectral image, a multispectral image, etc.

In one example, a video camera (not shown) is used to view carcasses along a line of sight. Each carcass is illuminated by one or more light sources, for example, by a laser beam. The light from the light sources may extend across the moving conveyor (such as a belt conveyor) to define a sharp shadow or light stripe line, with the area forward of the transverse beam being dark. When no carcass is being carried by the conveyor, the shadow line/light stripe forms a straight line across the conveyor belt. However, when a carcass passes across the shadow line/light stripe, the upper, irregular surface of the carcass produces an irregular shadow line/light stripe as viewed by a video camera directed downwardly on the carcass and the shadow line/light stripe. The video camera detects the displacement of the shadow line/light stripe from the position it would occupy if no carcass were present on the conveyor. This displacement represents the thickness of the carcass along the shadow line/light stripe, which may be processed by the data processing engine 260 for generating one or more images or otherwise providing data regarding the size and/or shape of the carcass.

For instance, the width of the carcass may be determined by the width of the displaced shadow line/light stripe. In another instance, the length of the carcass may be determined by the length of the time that the shadow lines are created by the carcass. In this regard, an encoder may be integrated into the structure of the conveyor to generate pulses at fixed time intervals corresponding to the forward movement of the conveyor.

In some embodiments, the optical scanner uses a single SICK® camera with a single laser light source that is suitable for capturing optical data and generating two or more images/views based on the optical data. For instance, the single camera may be in communication with a separate processor (having or more feature recognition modules or the like) and/or the data processing engine 260 for generating one or more views from the captured optical data.

In some embodiments at least two optical cameras each equipped with a different imaging process are used. For example, a simple optical camera, for example a greyscale camera, and/or RGB camera and/or IR and/or UV camera and/or a charge coupled device (CCD), can be used to acquire and/or generate one or more complete images of the carcass for detecting certain characteristics, such as, e.g., the outer contour of the carcass. Moreover, a second, special camera, for example a multispectral or hyperspectral camera, can be used to acquire images/data of specific regions or characteristics of the carcass, such as certain connective tissues. It should be appreciated that a single camera/scanner may instead be used to capture all the data needed to generate the various images, such as with various imaging processes.

It can be appreciated that the optical scanner may be configured for capturing optical data used to generate images for detecting certain carcass characteristics or parameters, such as object outline, height, length, width, thickness, area, outer contour configuration, perimeter, outer perimeter configuration, outer perimeter size and/or shape, volume and/or weight percentage of fat v. lean, concavity, flatness, roundness, etc., any of which could be used to determine the size, shape, or contour of at least a portion of the poultry carcass (such as the breast area) and/or the type of poultry carcass.

If the scanning device(s) 240 are used to determine the type of poultry carcass, such as chicken, turkey, Cornish hen, grouse, quail, or any other bird, the data processing engine 260 may then retrieve known values for that type of poultry carcass from the one or more data stores 268. Based on the processing of those known values, the data processing engine 260 may output one or more signals to the blade actuator assembly 232 for activating the linear actuator to move the blade 124 into the desired engaged or disengaged position. For instance, the scanning device(s) 240 may scan each poultry carcass at the entry end 112 of the poultry processing machine 100, and based on an identification of the poultry type using the processed scan data, output one or more signals to the blade actuator assembly 232 for moving the blade into certain engaged and disengaged position.

In another instance, the scanning device(s) 240 may scan each poultry carcass at the entry end 112 of the poultry processing machine 100, and based on an identification of a size parameter(s) of the poultry carcass (e.g., overall width, rib cage width, shape, outer contour, etc.) using the processed scan data, output one or more signals to the blade actuator assembly 232 for moving the blade into certain engaged and disengaged position.

In some embodiments, the engaged and disengaged position of the blade 124 is determined for each carcass as it is scanned by the scanning device(s) 240. In that regard, the positioning of the blade 124 is precisely determined for each carcass being processed by the carcass separation assembly 104, thereby optimizing the breast separation process for each carcass. In other embodiments, the engaged and disengaged position of the blade 124 is determined for some or all of the carcasses of a production run (e.g., small chicken carcasses) after at least one carcass is scanned at the beginning of the run. In that regard, the scanning device(s) 240 may be instructed (such as by the identification computing device 244) to scan a select number of carcasses only when a new production run is started. It should be appreciated that the identification computing device 244 may acquire and process data in any other manner to determine an engaged and/or disengaged position of the blade 124 for the poultry carcasses.

The identification computing device 244 may be implemented by any computing device or collection of computing devices, including but not limited to a desktop computing device, a laptop computing device, a mobile computing device, a server computing device, a computing device of a cloud computing system, and/or combinations thereof. In some embodiments, the processor(s) 248 may include any suitable type of general-purpose computer processor. In some embodiments, the processor(s) 248 may include one or more special-purpose computer processors or AI accelerators optimized for specific computing tasks, including but not limited to graphical processing units (GPUs), vision processing units (VPTs), and tensor processing units (TPUs).

In some embodiments, the communication interface(s) 252 include one or more hardware and or software interfaces suitable for providing communication links between components. The communication interface(s) 252 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

As used herein, "engine" refers to logic embodied in hardware or software instructions, which can be written in one or more programming languages, including but not limited to C, C++, C#, COBOL, JAVA™, PHP, Perl, HTML, CSS, Javascript, VBScript, ASPX, Go, and Python. An engine may be compiled into executable programs or written in interpreted programming languages. Software engines may be callable from other engines or from themselves. Generally, the engines described herein refer to logical modules that can be merged with other engines or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 16:
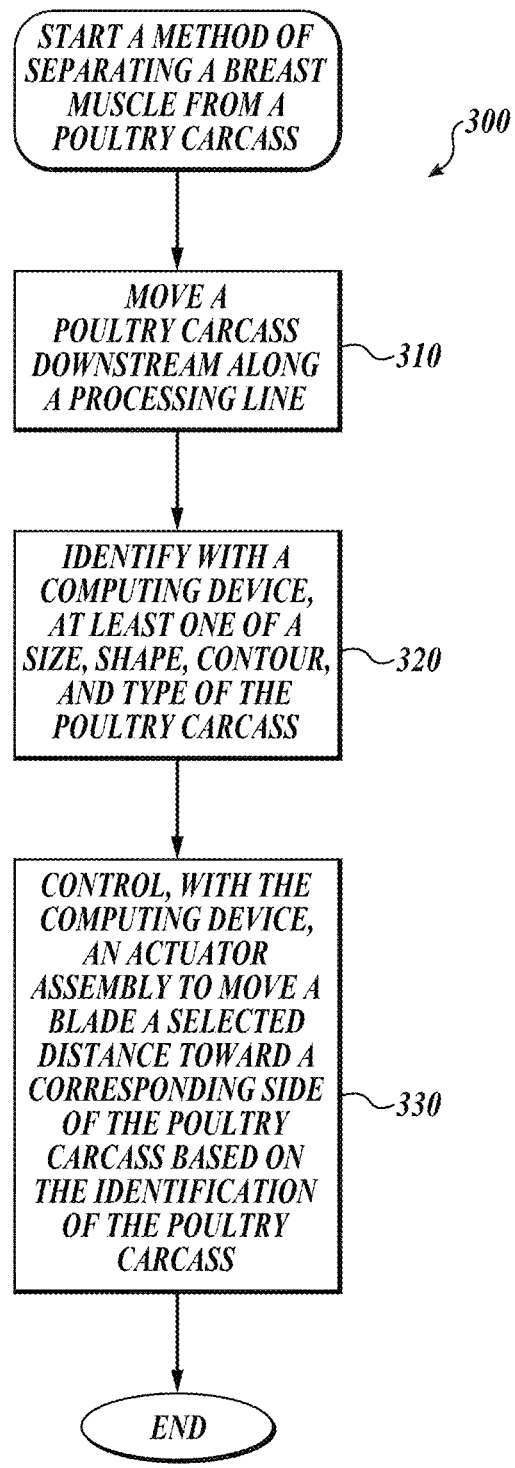
FIG. 16 shows a flowchart that illustrates a non-limiting example embodiment of a method of separating a breast muscle from a poultry carcass according to various aspects of the present disclosure.

A method 300 of separating a breast muscle from a poultry carcass will now be described with reference to FIG. 16. The method 300 may be carried out using the carcass separation assembly 104 shown and described herein for poultry carcasses being conveyed along a cone conveyor or the like of a processing system, such as poultry processing machine 100. Aspects of the method 300 may also be carried out at least in part by one or more of the data processing engine 260 and the actuator assembly output engine 264 of the identification computing device 244, and/or any other computing device in communication with the carcass separation assembly 104.

From a start block, the method 300 proceeds to block 310, where a poultry carcass is moved downstream along a processing line, such as from an entry end 112 of poultry processing machine 100 (see FIG. 1). The carcass may be moved downstream along a processing line via a cone conveyor, as described above.

The method 300 may proceed to block 320, where a computing device (such as the identification computing device 244 of the identification assembly 224) identifies at least one of a size, shape, contour, and type of the poultry carcass. For instance, the data processing engine 260 of the identification computing device 244 may retrieve known size values (e.g., width values of different portions of a poultry carcass) of a type of poultry carcass or other data associated with a type of poultry carcass from the one or more data stores 268 or another source. The data processing engine 260 may process that data to determine an optimal engaged and disengaged position of the blade 124 for the poultry type associated with the processed values, as discussed above.

The data processing engine 260 may output one or more signals indicative of processed values (e.g., the average width of the entire carcass across the carcass rib cage area, the average width of the skeletal frame across the carcass rib cage area, etc.). The data processing engine 260 may output the one or more signals to the actuator assembly output engine 264 for activating the linear actuator 152 to move the blade 124 into the desired engaged or disengaged position for some or all of the carcasses.

In that regard, the method 300 may then proceed to block 330, where a computing device (such as such as the identification computing device 244 of the identification assembly 224) may control an actuator assembly of the blade assembly to move the blade a selected distance toward a corresponding side of the poultry carcass based on the identification of the poultry carcass. For instance, upon receiving one or more signals from the data processing engine 260, the actuator assembly output engine 264 may output one or more signals to the blade actuator assembly 232 (and/or to the actuator assembly 148) to activate the actuator (such as linear actuator 152). The actuator may be activated to move the blade 124 into an optimal engaging position to separate the breast muscles of a carcass as well as into an optimal disengaged position to minimize interference of the blade 124 with a trailing portion of the carcass as it moves past the blade after breast separation.

In further aspects, the method 300 may include: scanning, with at least one scanning device, the poultry carcass; sending, with the at least one scanning device, scan image data to the computing device; processing, with the computing device, the scan image data to identify at least one the size, shape, contour, and type of the poultry carcass; and sending, with the computing device, at least one output signal to the actuator assembly of the blade assemblies to move the blade a selected distance toward the corresponding side of the poultry carcass based on the identification.

For instance, scanning device(s) 240 of the identification assembly 224 (which may include an X-ray scanner and an optical scanner, and/or any other suitable scanners) may capture one or more images of a carcass as it passes the scanning device(s) 240, such as near the entry end 112 of the poultry processing machine 100. The image data may be processed by the data processing engine 260 for determining at least one of the size, shape, contour, and type of poultry carcass. The data processing engine 260 may output one or more signals to the actuator assembly output engine 264 for activating the linear actuator 152 to move the blade 124 into the desired engaged or disengaged position based on the identification.

The method 300 may further include moving a poultry carcass downstream along a processing line toward a blade assembly (such as the first or second blade assembly 120/122), engaging a blade (such as blade 124) of the blade assembly with a side of the poultry carcass near an attachment of the breast muscle to bones of the corresponding side of the poultry carcass as the poultry carcass moves downstream passed the blade assembly, and supporting a corresponding wing of the poultry carcass in a spaced apart relationship relative to the breast muscle as the poultry carcass moves downstream passed the blade assembly, as for example described above with respect to FIGS. 12A-12E.

In some aspects, the method 300 may further include orienting the poultry carcass in a substantially horizontal position as the poultry carcass moves downstream passed the blade assembly with the breast muscle facing away from a conveyance plane of the processing line, as for example described above with respect to FIG. 11.

In some aspects, the method 300 may further include shearing the breast muscle from the bones on the corresponding side of the poultry carcass as the blade passes between the breast muscle and the bones on the side of the poultry carcass, as for example described above with respect to FIGS. 11 and 12A-12E.

In some aspects, the method 300 may further include penetrating the side of the poultry carcass with a tip (such as carcass-engaging tip 174) defined at an upper end of the blade and shearing the breast muscle from the bones on the side of the poultry carcass at a downward angle as the blade passes between the breast muscle and the bones on the side of the poultry carcass, as for example described above with respect to FIG. 11.

In some aspects, the method 300 may further include supporting the wing of the poultry carcass in tension (such as with tensioning assembly 128) as it is held in a spaced apart relationship relative to the corresponding breast muscle as the poultry carcass moves downstream passed the blade assembly.

Figure 17:
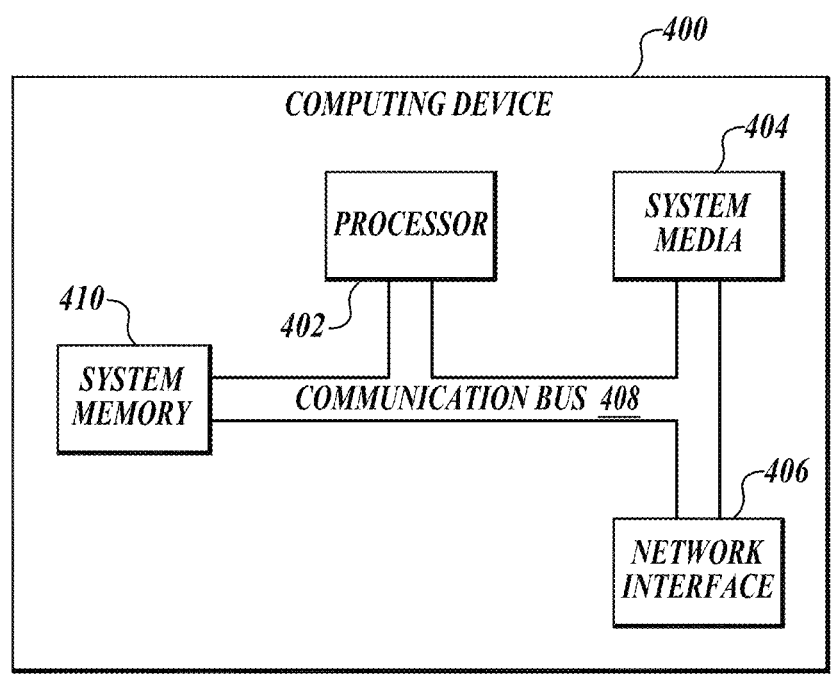
FIG. 17 shows a block diagram that illustrates a non-limiting example embodiment of a computing device appropriate for use as a computing device with embodiments of the present disclosure.

FIG. 17 is a block diagram that illustrates aspects of an exemplary computing device 400 appropriate for use as a computing device of the present disclosure. While multiple different types of computing devices were discussed above, the exemplary computing device 400 describes various elements that are common to many different types of computing devices. While FIG. 17 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 400 may be any one of any number of currently available or yet to be developed devices.

In its most basic configuration, the computing device 400 includes at least one processor 402 and a system memory 410 connected by a communication bus 408. Depending on the exact configuration and type of device, the system memory 410 may be volatile or nonvolatile memory, such as read only memory ("ROM"), random access memory ("RAM"), EEPROM, flash memory, or similar memory technology. Those of ordinary skill in the art and others will recognize that system memory 410 typically stores data and/or program modules that are immediately accessible to and/or currently being operated on by the processor 402. In this regard, the processor 402 may serve as a computational center of the computing device 400 by supporting the execution of instructions.

As further illustrated in FIG. 17, the computing device 400 may include a network interface 406 comprising one or more components for communicating with other devices over a network. Embodiments of the present disclosure may access basic services that utilize the network interface 406 to perform communications using common network protocols. The network interface 406 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 406 illustrated in FIG. 17 may represent one or more wireless interfaces or physical communication interfaces described and illustrated above with respect to particular components of the computing device 400.

In the exemplary embodiment depicted in FIG. 17, the computing device 400 also includes a storage medium 404. However, services may be accessed using a computing device that does not include means for persisting data to a local storage medium. Therefore, the storage medium 404 depicted in FIG. 17 is represented with a dashed line to indicate that the storage medium 404 is optional. In any event, the storage medium 404 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 402, system memory 410, communication bus 408, storage medium 404, and network interface 406 are known and commercially available. For ease of illustration and because it is not important for an understanding of the claimed subject matter, FIG. 17 does not show some of the typical components of many computing devices. In this regard, the computing device 400 may include input devices, such as a keyboard, keypad, mouse, microphone, touch input device, touch screen, tablet, and/or the like. Such input devices may be coupled to the computing device 400 by wired or wireless connections including RF, infrared, serial, parallel, Bluetooth, Bluetooth low energy, USB, or other suitable connections protocols using wireless or physical connections. Similarly, the computing device 400 may also include output devices such as a display, speakers, printer, etc. Since these devices are well known in the art, they are not illustrated or described further herein.

FIGS. 10A-10H show views of the blade 124 for use with the carcass separation assembly 104 according to exemplary embodiments of the present disclosure. It should be appreciated that various aspects of the blade 124 are ornamental in nature. In that regard, FIGS. 10A-10H show new designs of a blade.

The blade designs include any and all parts, portions, elements, and/or combinations thereof of the various aspects of the exemplary blade shown in the FIGS, including a design that replaces any solid line with a broken line to disclaim any part, portion, element and/or combination thereof of the disclosed design, or to replace any broken line with a solid line to claim any part, portion, element and/or combination thereof of the disclosed designs. Any thin solid lines that are now shown in the FIGS. or later added may represent contours only and will not necessarily illustrate an ornamentation of decoration on the surface of an article.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an exemplary embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C).

Similarly, items listed in the form of "at least one of A, B, or C" can mean (A); (B); (C); (A and B); (B and C); (A and C); or (A, B, and C).

Language such as "up", "down", "left", "right", "first", "second", etc., in the present disclosure is meant to provide orientation for the reader with reference to the drawings and is not intended to be the required orientation of the components or graphical images or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative FIG. Additionally, the inclusion of a structural or method feature in a particular FIG. is not meant to imply that such feature is required in all embodiments and, in some embodiments, it may not be included or may be combined with other features.

As used herein, the terms "about", "approximately," etc., in reference to a number, is used herein to include numbers that fall within a range of 10%, 5%, or 1% in either direction (greater than or less than) the number unless otherwise stated or otherwise evident from the context (except where such number would exceed 100% of a possible value).

Where electronic or software components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

As used herein, "carcass" means a portion of a dressed bird from which the internal organs, head, neck, pelvis, and optionally the thighs and legs have been removed.

"Longitudinal" means a horizontal direction along the length of the conveyor, or parallel to that length. "Transverse" is a horizontal direction perpendicular to longitudinal.

"Downstream" is the longitudinal direction in which the product moves; "upstream" is the opposite. The "leading" edge of a component is the edge facing the downstream direction; "trailing" is the opposite. The "distal" end of an elongate member is its free end; "proximal" is the opposite.

Headings of sections provided in this patent application and the title of this patent application are for convenience only and are not to be taken as limiting the disclosure in any way.

While preferred embodiments of the present invention have been shown and described herein, it will be apparent to those skilled in the art that such embodiments are provided by way of example only. Numerous variations, changes, and substitutions will now occur to those skilled in the art without departing from the invention. Various alternatives to the embodiments of the invention described herein may be employed in practicing the invention. It is intended that the following claims define the scope of the invention and that methods and structures within the scope of these claims and their equivalents be covered thereby.

The invention claimed is:

1. A carcass separation assembly, comprising:
a first blade assembly configured to separate a first breast muscle from at least one of wish bone, a rib bone, and a fan bone on a first side of a poultry carcass with a shearing force as the poultry carcass moves downstream past the first blade assembly; and
a first tensioning assembly configured to support a first wing of the poultry carcass in a spaced apart relationship relative to the first breast muscle as the poultry carcass moves downstream past the first blade assembly.

2. The carcass separation assembly of claim 1, wherein the first blade assembly includes a first blade, comprising:
a body having a first end opposite a second end, wherein at least a portion of the body between the first and second ends is shaped to substantially correspond to a shape of a portion of the first side of the poultry carcass;
a curved upstream edge extending between at least a portion of the first and second ends of the body; and
a shearing edge portion defined along at least a portion of the curved upstream edge.

3. The carcass separation assembly of claim 2, wherein an upper portion of the body extending from the second end toward the first end of the body is shaped to substantially correspond to the shape of the portion of the first side of the poultry carcass.

4. The carcass separation assembly of claim 3, wherein the curved upstream edge extends along the upper portion of the body to define a carcass-engaging tip at the second end of the body.

5. The carcass separation assembly of claim 4, wherein the shearing edge portion is defined along the curved upstream edge on the upper portion of the body.

6. The carcass separation assembly of claim 5, wherein the shearing edge portion is defined by a tapered edge portion of the curved upstream edge.

7. The carcass separation assembly of claim 6, wherein the tapered edge portion defines a shearing edge that is that is sufficiently sharp to penetrate tissue of the poultry carcass but sufficiently dull to substantially prevent the shearing edge from cutting the tissue of the poultry carcass.

8. The carcass separation assembly of claim 1, wherein the first tensioning assembly includes a guide bar extending along a length of a processing line along which the poultry carcass moves, wherein the guide bar is configured to engage an underside portion of the first wing and hold the first wing in tension relative to the first breast muscle such that the first breast muscle is pulled upwardly and outwardly by the first wing as the poultry carcass moves downstream past the first blade assembly.

9. The carcass separation assembly of claim 8, wherein the guide bar extends gradually away from a conveyance plane of the processing line as the guide bar extends in the downstream direction and gradually toward a center longitudinal axis of the processing line as the guide bar extends in the downstream direction.

10. A method of separating a first breast muscle from a poultry carcass, comprising:
moving a poultry carcass downstream along a processing line toward a first blade assembly;
engaging a first blade of the first blade assembly with a first side of the poultry carcass near an attachment of the first breast muscle to at least one of a wish bone, a rib bone, and a fan bone on the first side of the poultry carcass as the poultry carcass moves downstream past the first blade assembly;

supporting a first wing of the poultry carcass in a spaced apart relationship relative to the first breast muscle as the poultry carcass moves downstream past the first blade assembly; and shearing the first breast muscle from the at least one of a wish bone, a rib bone, and a fan bone on the first side of the poultry carcass as the first blade passes between the first breast muscle and the at least one of a wish bone, a rib bone, and a fan bone on the first side of the poultry carcass.

11. The method of claim 10, further comprising:

orienting the poultry carcass in a substantially horizontal position as the poultry carcass moves downstream past the first blade assembly with the first breast muscle facing away from a conveyance plane of the processing line; and penetrating the first side of the poultry carcass with a tip defined at an upper end of the first blade and shearing the first breast muscle from the at least one of a wish bone, a rib bone, and a fan bone on the first side of the poultry carcass at a downward angle as the first blade passes between the first breast muscle and the bones on the first side of the poultry carcass.

12. The method of claim 10, further comprising shearing the first breast muscle from the at least one of a wish bone, a rib bone, and a fan bone on the first side of the poultry carcass as the first blade passes between the first breast muscle and the bones on the first side of the poultry carcass.

13. The method of claim 11, further comprising pulling the first breast muscle upwardly and outwardly by the first wing as the poultry carcass moves downstream past the first blade assembly.

14. The carcass separation assembly of claim 1, wherein the first blade assembly includes a first blade that is shaped, sized, and configured to separate the first breast muscle from the carcass with a shearing force when the first wing of the poultry carcass is held in tension in a spaced apart relationship relative to the first breast muscle by the first tensioning assembly.

15. The carcass separation assembly of claim 14, wherein the first breast muscle is pulled upwardly and outwardly by the first wing when it is supported by the first tensioning assembly.

16. The carcass separation assembly of claim 1, wherein the first blade assembly includes a first blade that has a body with an overall flattened, curved hook shape.

17. The carcass separation assembly of claim 1, wherein the first blade assembly includes a first blade that is configured to shear a top of the first breast muscle from the carcass generally diagonally downwardly across a body of the carcass.

18. A carcass separation assembly, comprising:

a first blade assembly configured to separate a first breast muscle from at least one of wish bone, a rib bone, and a fan bone on a first side of a poultry carcass as the poultry carcass moves downstream past the first blade assembly;

a first tensioning assembly configured to support a first wing of the poultry carcass in a spaced apart relationship relative to the first breast muscle as the poultry carcass moves downstream past the first blade assembly;

a first actuator assembly configured to move the first blade assembly into engagement with the first side of the poultry carcass as the poultry carcass moves past the first blade assembly; and an identification assembly in communication with the first actuator assembly, the identification assembly including at least one scanning device and an identification computing device, the identification computing device having a processor, a computer-readable memory, and computer code stored in the computer-readable memory for causing the processor to operate the identification computing device to process signals received by the at least one scanning device for activating the first actuator assembly to move the first blade assembly into engagement with the first side of the poultry carcass as the poultry carcass moves downstream past the first blade assembly.

19. The carcass separation assembly of claim 18, wherein the at least one scanning device is configured to:

capture scan image data of at least one poultry carcass when it is located upstream of the first blade assembly and as it is moving toward the first blade assembly; and output scan image data to the identification computing device.

20. The carcass separation assembly of claim 19, wherein the identification computing device comprises:

a scanning data processing engine configured to process the scan image data including at least one of comparing actual values taken from the scan image data to reference values for poultry carcasses and comparing the scan image data to reference image data for poultry carcasses; and an actuator assembly output engine configured to output one or more signals to the first actuator assembly for activating the first actuator assembly to move the first blade assembly into a position relative to the first side of the poultry carcass as the poultry carcass moves past the first blade assembly based upon the processed scan image data.

* * * * *